US012460382B2

(12) United States Patent
Amano et al.

(10) Patent No.: US 12,460,382 B2
(45) Date of Patent: Nov. 4, 2025

(54) WORK MACHINE

(71) Applicant: Hitachi Construction Machinery Co., Ltd., Tokyo (JP)

(72) Inventors: Hiroaki Amano, Tsuchiura (JP); Kento Kumagai, Tsuchiura (JP); Shinji Nishikawa, Tsuchiura (JP); Akihiro Narazaki, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 18/690,103

(22) PCT Filed: Mar. 31, 2023

(86) PCT No.: PCT/JP2023/013664
§ 371 (c)(1),
(2) Date: Mar. 7, 2024

(87) PCT Pub. No.: WO2023/191084
PCT Pub. Date: Oct. 5, 2023

(65) Prior Publication Data

US 2024/0287763 A1 Aug. 29, 2024

(30) Foreign Application Priority Data

Mar. 31, 2022 (JP) ................................ 2022-060391

(51) Int. Cl.
*E02F 9/22* (2006.01)
*E02F 9/20* (2006.01)
(Continued)

(52) U.S. Cl.
CPC .................. *E02F 9/22* (2013.01); *E02F 9/20* (2013.01); *E02F 9/2228* (2013.01);
(Continued)

(58) Field of Classification Search
CPC ... E02F 9/22; E02F 9/20; E02F 9/2228; E02F 9/2235; E02F 9/2296; F15B 11/02;
(Continued)

(56) References Cited

U.S. PATENT DOCUMENTS 6,732,512 B2 * 5/2004 Pfaff .................... E02F 9/2025 60/459
8,340,875 B1 * 12/2012 Shatters ................ F15B 21/087 701/50
(Continued)

FOREIGN PATENT DOCUMENTS

JP 2-142902 A 6/1990
JP 6-117408 A1 4/1994
(Continued)

OTHER PUBLICATIONS

International Search Report (PCT/ISA/210) issued in PCT Application No. PCT/JP2023/013664 dated Jun. 6, 2023 with partial English translation (6 pages).
(Continued)

*Primary Examiner* — Dustin T Nguyen
(74) *Attorney, Agent, or Firm* — Crowell & Moring LLP

(57) ABSTRACT

A controller of a work machine computes a target velocity of a fluid pressure actuator according to an operation signal from an operation device, computes target thrust or target torque of the fluid pressure actuator on the basis of a driven state of the fluid pressure actuator, and controls a velocity of the fluid pressure actuator by a meter-out control valve on the basis of the operation signal from the operation device and controls at least one of a pump and a meter-in control valve such that a pressure on a meter-in side of the fluid pressure actuator is equal to or higher than a predetermined value when a positive or negative sign of the target velocity as a computation result is different from a positive or
(Continued)

negative sign of the target thrust or the target torque as a computation result.

3 Claims, 19 Drawing Sheets

(51) Int. Cl.

| | |
|---|---|
| ***F15B 11/02*** | (2006.01) |
| ***F15B 11/028*** | (2006.01) |
| ***F15B 11/042*** | (2006.01) |
| ***F15B 11/044*** | (2006.01) |
| ***F15B 21/08*** | (2006.01) |

(52) U.S. Cl.
CPC ............ *E02F 9/2235* (2013.01); *F15B 11/02* (2013.01); *F15B 11/028* (2013.01); *F15B 11/042* (2013.01); *F15B 11/044* (2013.01); *F15B 21/087* (2013.01); *E02F 9/2296* (2013.01); *F15B 2211/20546* (2013.01); *F15B 2211/327* (2013.01); *F15B 2211/351* (2013.01); *F15B 2211/353* (2013.01); *F15B 2211/365* (2013.01); *F15B 2211/40515* (2013.01); *F15B 2211/41509* (2013.01); *F15B 2211/426* (2013.01); *F15B 2211/455* (2013.01); *F15B 2211/46* (2013.01); *F15B 2211/6309* (2013.01); *F15B 2211/6313* (2013.01); *F15B 2211/6346* (2013.01); *F15B 2211/6655* (2013.01)

(58) Field of Classification Search
CPC ..... F15B 11/028; F15B 11/042; F15B 11/044; F15B 21/087; F15B 2211/327; F15B 2211/351; F15B 2211/353; F15B 2211/365; F15B 2211/40515; F15B 2211/41509; F15B 2211/426; F15B 2211/455; F15B 2211/46; F15B 2211/6309; F15B 2211/6313; F15B 2211/6346; F15B 2211/6655
See application file for complete search history.

(56) References Cited

U.S. PATENT DOCUMENTS

| | | | | |
|---|---|---|---|---|
| 8,973,358 | B2 * | 3/2015 | Kuehn | E02F 9/2289 60/420 |
| 10,408,238 | B2 * | 9/2019 | Wang | F15B 19/002 |
| 11,286,644 | B2 * | 3/2022 | Maekawa | E02F 9/262 |
| 2012/0285152 | A1 | 11/2012 | Sugano et al. | |
| 2014/0130486 | A1 | 5/2014 | Sugano et al. | |
| 2020/0232482 | A1 | 7/2020 | Miyamoto et al. | |
| 2021/0198868 | A1 | 7/2021 | Maekawa et al. | |
| 2023/0265865 | A1 | 8/2023 | Nose et al. | |

FOREIGN PATENT DOCUMENTS

| | | | |
|---|---|---|---|
| JP | 2000-310201 | A | 11/2000 |
| JP | 2012-237423 | A | 12/2012 |
| JP | 2014-98404 | A | 5/2014 |
| JP | 2019-124227 | A | 7/2019 |
| JP | 2020-29717 | A | 2/2020 |
| JP | 2022-17833 | A | 1/2022 |
| WO | WO 2022/208694 | A1 | 10/2022 |

OTHER PUBLICATIONS

Japanese-language Written Opinion (PCT/ISA/237) issued in PCT Application No. PCT/JP2023/013664 dated Jun. 6, 2023 with English translation (8 pages).

International Preliminary Report on Patentability (PCT/IB/338 & PCT/IB/373) issued in PCT Application No. PCT/JP2023/013664 dated Oct. 10, 2024, including English translation of document C2 (Japanese-language Written Opinion (PCT/ISA/237), filed on Mar. 7, 2024) (7 pages).

* cited by examiner

FIG. 6

931

| CASE | TARGET VELOCITY (INPUT Vt) | TARGET THRUST (INPUT Ft) | METER-IN FLAG (OUTPUT fg) | METER-IN TARGET PRESSURE (OUTPUT Pit) | METER-OUT TARGET PRESSURE (OUTPUT Pot) |
|---|---|---|---|---|---|
| 1 | ≥0 | ≥0 | BOTTOM CHAMBER (True) | $\frac{F_t + S_r P_{bf2}}{S_b}$ | $P_{bf2}$ |
| 2 | ≥0 | <0 | BOTTOM CHAMBER (True) | $P_{bf1}$ | $\frac{-F_t + S_b P_{bf1}}{S_r}$ |
| 3 | <0 | ≥0 | ROD CHAMBER (False) | $P_{bf1}$ | $\frac{F_t + S_r P_{bf1}}{S_b}$ |
| 4 | <0 | <0 | ROD CHAMBER (False) | $\frac{-F_t + S_b P_{bf2}}{S_r}$ | $P_{bf2}$ |

FIG. 7

932

| CASE | TARGET VELOCITY (INPUT ωt) | TARGET TORQUE (INPUT Tt) | METER-IN FLAG (OUTPUT fg) | METER-IN TARGET PRESSURE (OUTPUT Pit) | METER-OUT TARGET PRESSURE (OUTPUT Pot) |
|---|---|---|---|---|---|
| 1 | ≥0 | ≥0 | FIRST PORT (RIGHTWARD ROTATION) SIDE (True) | $\frac{T_t}{q_m} + P_{bf2}$ | $P_{bf2}$ |
| 2 | ≥0 | <0 | FIRST PORT (RIGHTWARD ROTATION) SIDE (True) | $P_{bf1}$ | $\frac{-T_t}{q_m} + P_{bf1}$ |
| 3 | <0 | ≥0 | SECOND PORT (LEFTWARD ROTATION) SIDE (False) | $P_{bf1}$ | $\frac{T_t}{q_m} + P_{bf1}$ |
| 4 | <0 | <0 | SECOND PORT (LEFTWARD ROTATION) SIDE (False) | $\frac{-T_t}{q_m} + P_{bf2}$ | $P_{bf2}$ |

COMPARATIVE EXAMPLE

FIG. 17

931A

| CASE | TARGET VELOCITY (INPUT Vt) | TARGET THRUST (INPUT Ft) | METER-IN FLAG (OUTPUT fg) | METER-IN TARGET PRESSURE (OUTPUT Pit) | METER-OUT TARGET PRESSURE (OUTPUT Pot) |
|---|---|---|---|---|---|
| 1 | ≥0 | ≥0 | BOTTOM (True) | MAXIMUM VALUE OF $P_b$ AND $P_{bf1}$ | (0) |
| 2 | ≥0 | <0 | BOTTOM (True) | $P_{bf1}$ | $\frac{-F_t + S_b P_{bf1}}{S_r}$ |
| 3 | <0 | ≥0 | ROD (False) | $P_{bf1}$ | $\frac{F_t + S_r P_{bf1}}{S_b}$ |
| 4 | <0 | <0 | ROD (False) | MAXIMUM VALUE OF $P_r$ AND $P_{bf1}$ | (0) |

FIG. 18

932A

| CASE | TARGET VELOCITY (INPUT ωt) | TARGET TORQUE (INPUT Tt) | METER-IN FLAG (OUTPUT fg) | METER-IN TARGET PRESSURE (OUTPUT Pit) | METER-OUT TARGET PRESSURE (OUTPUT Pot) |
|---|---|---|---|---|---|
| 1 | ≥0 | ≥0 | FIRST PORT (RIGHTWARD ROTATION) SIDE (True) | MAXIMUM VALUE OF $P_A$ AND $P_{bf1}$ | (0) |
| 2 | ≥0 | <0 | FIRST PORT (RIGHTWARD ROTATION) SIDE (True) | $P_{bf1}$ | $\frac{-T_t}{q_m} + P_{bf1}$ |
| 3 | <0 | ≥0 | SECOND PORT (LEFTWARD ROTATION) SIDE (False) | $P_{bf1}$ | $\frac{T_t}{q_m} + P_{bf1}$ |
| 4 | <0 | <0 | SECOND PORT (LEFTWARD ROTATION) SIDE (False) | MAXIMUM VALUE OF $P_B$ AND $P_{bf1}$ | (0) |

WORK MACHINE

TECHNICAL FIELD

The present invention relates to a work machine, and more particularly to a work machine including hydraulic actuators that operate driven bodies such as a work device and a swing structure.

BACKGROUND ART

In a hydraulic work machine such as a hydraulic excavator, a front work device constituted by link members such as a boom and an arm is operated by hydraulic cylinders as hydraulic actuators. In addition, a swing structure is swung by a hydraulic motor as a hydraulic actuator. In order to operate the front work device and the swing structure at desired velocities, the flow rates of hydraulic fluid flowing into the hydraulic actuators need to be controlled accurately. However, in a case where the work device held in the air operates in a gravitational direction, there is a concern for the occurrence of cavitation in a hydraulic cylinder when the hydraulic cylinder runs away due to the own weight of the work device and the flow rate of a flow into the hydraulic cylinder becomes insufficient. In addition, in a case where the swing structure swings in an acting direction of inertia, there is a concern for the occurrence of cavitation in the hydraulic motor when the hydraulic motor runs away and the flow rate of a flow into the hydraulic motor becomes insufficient.

There is a technology described in Patent Document 1, for example, as a conventional technology for avoiding the occurrence of cavitation, which is caused by runaway of a hydraulic actuator. A hydraulic circuit of a construction machine described in Patent Document 1 includes a spool valve that switches the flow direction of hydraulic fluid supplied from a variable pump to an actuator, and a control valve that controls a supply flow rate (meter-in flow rate) for the actuator. Pressures on an upstream side and a downstream side of the control valve are sensed. Generally, meter-in flow rate control is performed by controlling the opening degree of the control valve according to a command value of a controller. However, when the pressure on the downstream side of the control valve becomes equal to or lower than a set pressure, it is determined that a counter load has acted on the actuator, and the opening degree of the control valve is made larger than the command value of the controller (at a normal time) such that the pressure on the downstream side of the control valve is not decreased further. It is assumed that the occurrence of cavitation can thereby be prevented.

PRIOR ART DOCUMENT

Patent Document

Patent Document 1: JP-H06-117408-A

SUMMARY OF THE INVENTION

Problems to be Solved by the Invention

In the hydraulic circuit of the construction machine as described in Patent Document 1, when the front work device operates in the gravitational direction (own weight falling direction), a counter load acts on the hydraulic actuator that operates the front work device. In this case, the technology described in Patent Document 1 makes the opening degree of the control valve performing the meter-in flow rate control larger than a normal degree (command value of the controller). Therefore, the operation velocity in the own weight falling direction of the front work device becomes faster than that at a time of a normal operation. This means that the driving velocity of the hydraulic actuator changes according to the magnitude of the load on the hydraulic actuator. That is, it becomes difficult to perform the velocity control of the front work device according to operation of an operation device. In addition, when a state in which the opening degree of the control valve is made larger than a normal degree is continued in order to maintain the pressure on the downstream side of the control valve at the set pressure or higher, there is a concern for an increase in the velocity of the hydraulic actuator due to an excessive increase in the meter-in flow rate.

Patent Document 1 also describes a configuration that performs electric control of the spool valve. The description includes control of the spool valve that reduces the opening degree of a meter-out restrictor in order to prevent runaway of the hydraulic actuator in the case of this configuration. However, Patent Document 1 does not describe a specific method for the velocity control of the hydraulic actuator in a case where such control of the spool valve is performed. Depending on a method of controlling the spool valve, the velocity of the hydraulic actuator may deviate from a target velocity corresponding to the operation of the operation device, even when runaway of the hydraulic actuator can be prevented.

The present invention has been made to solve the above-described problems. It is an object of the present invention to provide a work machine that can prevent the occurrence of cavitation in hydraulic actuators while implementing the velocity control of the hydraulic actuators according to operation of an operation device.

Means for Solving the Problems

The present application includes a plurality of means for solving the above-described problems. To cite an example of the means, there is provided a work machine including a fluid pressure actuator that operates a driven body by being driven by supply and discharge of working fluid, a pump that supplies the working fluid to the fluid pressure actuator, a meter-in control valve capable of controlling a flow rate of the working fluid to be supplied from the pump to the fluid pressure actuator, a meter-out control valve capable of controlling a flow rate of the working fluid to be discharged from the fluid pressure actuator, an operation device that outputs an operation signal giving an instruction for driving of the fluid pressure actuator, and a controller that controls the pump, the meter-in control valve, and the meter-out control valve, the controller being configured to compute a target velocity of the fluid pressure actuator according to the operation signal from the operation device, compute a target thrust or target torque of the fluid pressure actuator on the basis of a driven state of the fluid pressure actuator, and control a velocity of the fluid pressure actuator by the meter-out control valve on the basis of the operation signal from the operation device and control at least one of the pump and the meter-in control valve such that a pressure on a meter-in side of the fluid pressure actuator is equal to or higher than a predetermined value, when a positive or negative sign of the target velocity as a computation result is different from a positive or negative sign of the target thrust or the target torque as a computation result.

Advantages of the Invention

According to the present invention, when the driven body is operated in an acting direction of inertia, at least one of the pump and the meter-in control valve is controlled such that the pressure on the meter-in side of the fluid pressure actuator is equal to or higher than the predetermined value, while the driving velocity of the fluid pressure actuator is controlled by the meter-out control valve according to the operation of the operation device. Thus, by setting the predetermined value to a value at which the occurrence of cavitation can be avoided, it is possible to prevent the occurrence of cavitation in the fluid pressure actuator while implementing the velocity control of the fluid pressure actuator according to the operation of the operation device.

Problems, configurations, and effects other than those described above will be made apparent by the following description of embodiments.

BRIEF DESCRIPTION OF THE DRAWINGS

FIG. 6 is a table illustrating an example of a computing method of a target pressure computing section in the controller according to the first embodiment illustrated in FIG. 3 (in a case of hydraulic cylinders).

FIG. 7 is a table illustrating another example of the computing method of the target pressure computing section in the controller according to the first embodiment illustrated in FIG. 3 (in a case of a hydraulic motor).

FIG. 17 is a table illustrating an example of a computing method of a target pressure computing section in the controller according to the second embodiment illustrated in FIG. 16 (in a case of hydraulic cylinders).

FIG. 18 is a table illustrating another example of the computing method of the target pressure computing section in the controller according to the second embodiment illustrated in FIG. 16 (in a case of a hydraulic motor).

MODES FOR CARRYING OUT THE INVENTION

Embodiments of a work machine according to the present invention will hereinafter be described with reference to the drawings. In the following embodiments, description will be made by citing a hydraulic excavator as an example of the work machine.

First Embodiment

Figure 1:
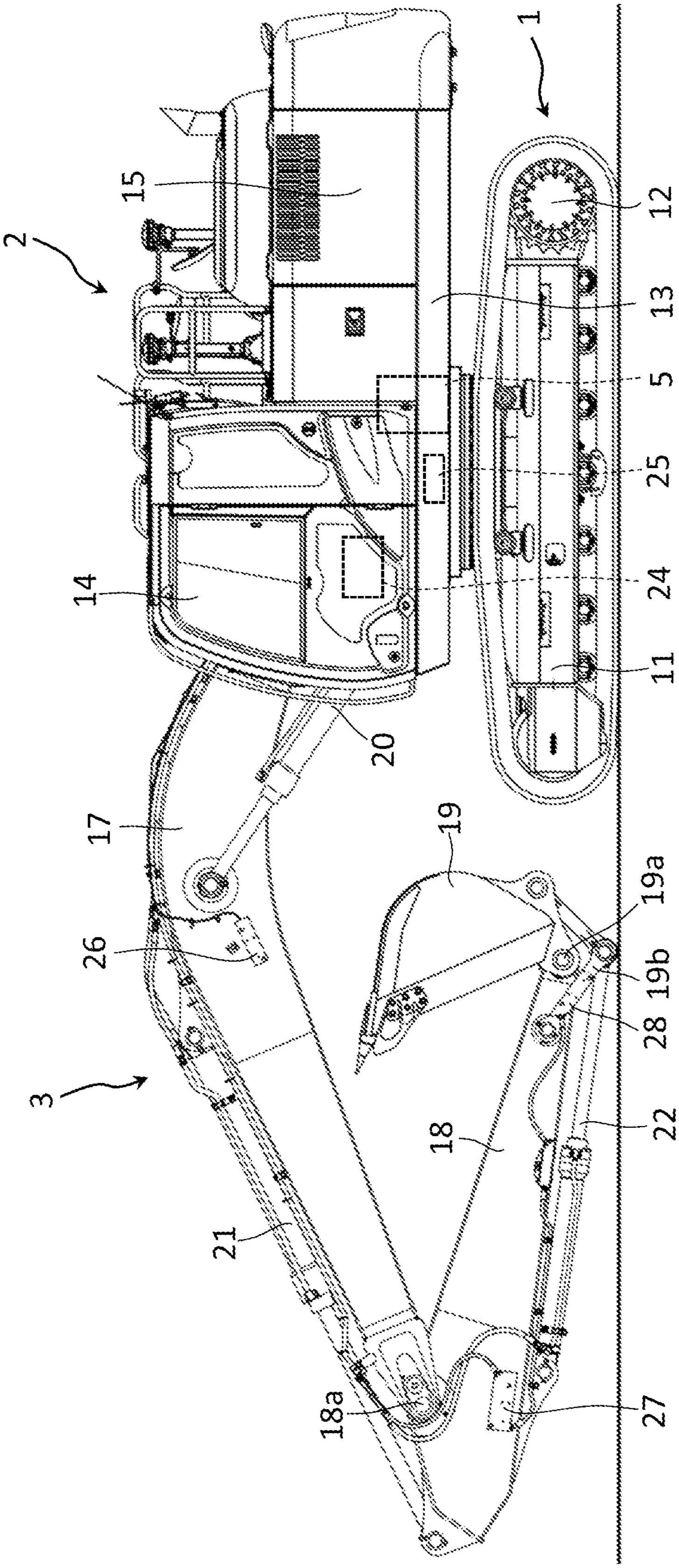
FIG. 1 is an external view illustrating a hydraulic excavator as a first embodiment of a work machine according to the present invention.

First, a general configuration of a hydraulic excavator as a first embodiment of the work machine according to the present invention will be described with reference to FIG. 1. FIG. 1 is an external view illustrating the hydraulic excavator as the first embodiment of the work machine according to the present invention. In the following, description will be made using directions as viewed from an operator seated in a cab seat.

In FIG. 1, the hydraulic excavator generally includes a self-propellable lower track structure 1; an upper swing structure 2 swingably mounted on the lower track structure 1; and a front work device 3 provided to a front portion of the upper swing structure 2 in such a manner as to be rotatable (raisable and lowerable) in an upward-downward direction. The upper swing structure 2 is constituted as a driven body that is made to perform a swing operation with respect to the lower track structure 1 by a swing hydraulic motor 5 (including a velocity reduction mechanism and the like) as a hydraulic actuator driven by the supply and discharge of hydraulic fluid.

The lower track structure 1 has a crawler type track device 11 on both a left side and a right side (only one side is illustrated). The track device 11 is configured to perform a travelling operation by a travelling hydraulic motor 12 as a hydraulic actuator.

The upper swing structure 2 includes a swing frame 13 as a supporting structural body, a cab 14 installed on a front side of the swing frame 13, and a machine room 15 provided on a rear side of the cab 14. The cab 14 is a part to be boarded by the operator. Arranged in the cab 14 are an operation device 6 to be described later and used for operating the hydraulic excavator, a revolution speed dial 7 (see FIG. 2 to be described later for both), and the like. The machine room 15 houses, for example, a hydraulic pump 31, a prime mover 32, various control valves 34 to 39 (see FIG. 2 to be described later), and the like to be described later.

The front work device 3 is, for example, an articulated work device constituted by coupling a plurality of driven bodies to each other rotatably in a vertical direction. The plurality of driven bodies are constituted by, for example, a boom 17, an arm 18, and a bucket 19 as a work tool. The boom 17 has a proximal end portion thereof rotatably coupled to a front portion of the swing frame 13 of the upper swing structure 2 via a joint portion (not illustrated). A proximal end portion of the arm 18 is rotatably coupled to a distal end portion of the boom 17 via a joint portion 18*a*. A proximal end portion of the bucket 19 is rotatably coupled to a distal end portion of the arm 18 via a joint portion 19*a*. The boom 17, the arm 18, and the bucket 19 are respectively operated by a boom cylinder 20, an arm cylinder 21, and a bucket cylinder 22 as hydraulic actuators driven by the supply and discharge of the hydraulic fluid. Incidentally, the bucket 19 is configured such that the driving of the bucket cylinder 22 is transmitted to the bucket 19 via a link member 19*b*.

A first posture sensor 24 and a second posture sensor 25 as posture sensors that sense physical quantities (posture information) related to the posture of the upper swing structure 2 as a driven body are installed in the upper swing structure 2. The first posture sensor 24 senses an angle (swing angle) formed between the upper swing structure 2 and the lower track structure 1 as the posture information of the upper swing structure 2. The first posture sensor 24 is constituted by an angle sensor, for example. The first posture sensor 24 can also sense the angular velocity (swing velocity) of the upper swing structure 2 from temporal changes in the sensed swing angle. The second posture sensor 25 can sense, for example, an inclination (pitch angle) in a front-rear direction of the upper swing structure 2 with respect to a reference plane and an inclination (roll angle) in a left-right direction (width direction) of the upper swing structure 2 with respect to the reference plane as the posture information of the upper swing structure 2. The second posture sensor 25 is constituted by, for example, an inertial measurement device (Inertial Measurement Unit: IMU). The second posture sensor 25 can measure an angular velocity and an acceleration as physical quantities (operation information) related to the operation of the upper swing structure 2. The first posture sensor 24 and the second posture sensor 25 each output a sensing signal corresponding to a sensed value to a controller 80 (see FIG. 2 to be described later) to be described later.

On the front work device 3, a third posture sensor 26, a fourth posture sensor 27, and a fifth posture sensor 28 that respectively sense physical quantities (posture information) related to the postures of the boom 17, the arm 18, and the bucket 19 as driven bodies are installed as posture sensors that sense physical quantities (posture information) related to the posture of the front work device 3. The third posture sensor 26 and the fourth posture sensor 27 are respectively installed on the boom 17 and the arm 18. The fifth posture sensor 28 is installed on the link member 19*b*, for example. However, the fifth posture sensor 28 can also be installed on the bucket 19 itself.

The posture sensors 26 to 28 are constituted by an inertial measurement device (IMU), for example. The posture sensors 26 to 28 can sense inclinations (angles) of the respective driven bodies 17 to 19 with respect to the reference plane. The posture sensors 26 to 28 can measure angular velocities and accelerations as physical quantities (operation information) related to the operation of the driven bodies 17 to 19. Each of the posture sensors 26 to 28 outputs a sensing signal corresponding to a sensed value to the controller 80 (see FIG. 2 to be described later) to be described later.

Figure 2:
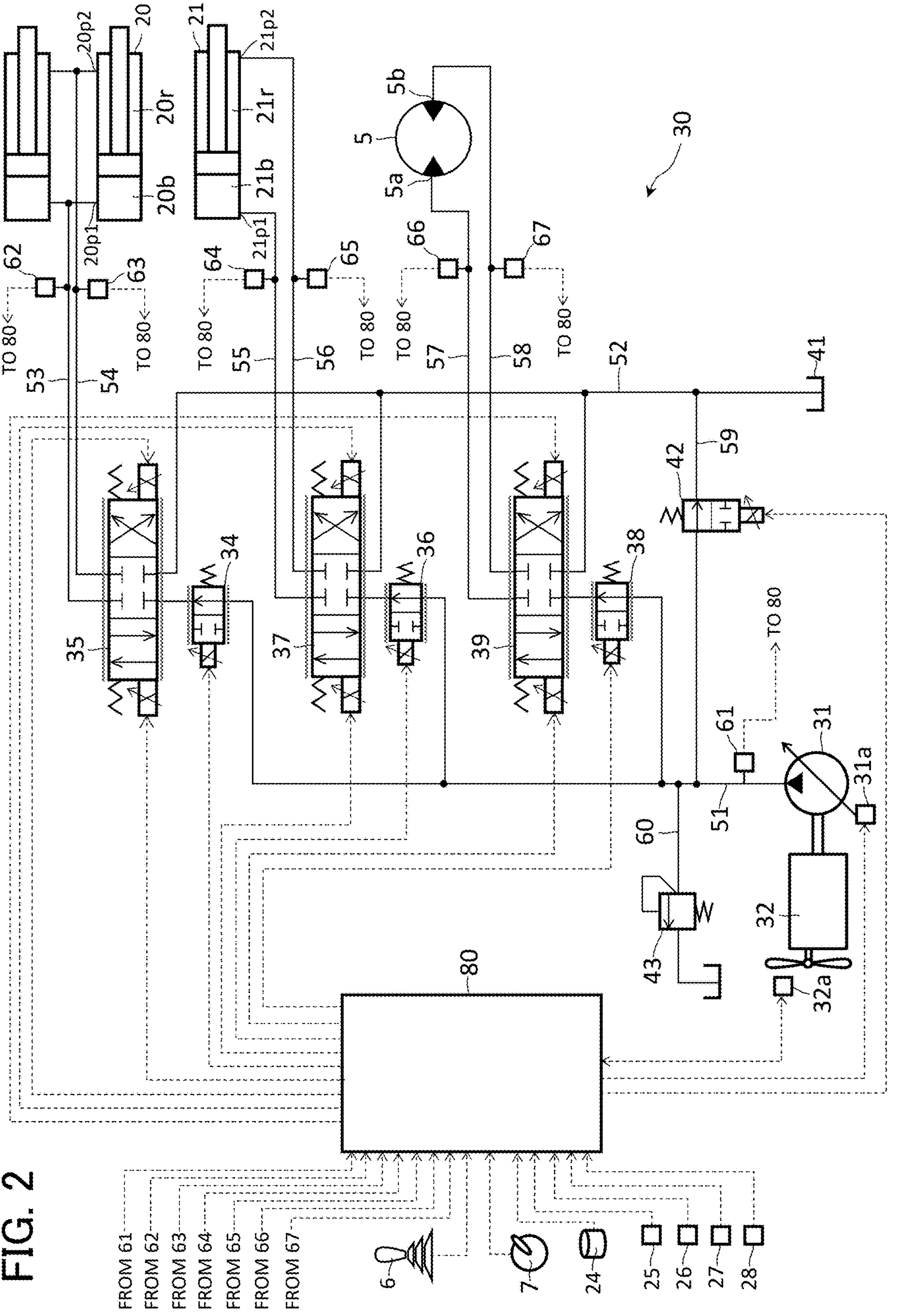
FIG. 2 is a hydraulic circuit diagram illustrating a configuration of a hydraulic system of the work machine according to the first embodiment and a diagram illustrating a control system of the hydraulic system.

Next, a configuration of a hydraulic system in the first embodiment of the work machine according to the present invention will be described with reference to FIG. 2. FIG. 2 is a hydraulic circuit diagram illustrating the configuration of the hydraulic system of the work machine according to the first embodiment and a diagram illustrating a control system of the hydraulic system. Incidentally, in FIG. 2, broken lines represent control lines.

In FIG. 2, the hydraulic excavator has a hydraulic system 30 that drives the lower track structure 1, the upper swing structure 2, and the front work device 3 (see FIG. 1 for each) by hydraulic pressure. The hydraulic system 30 includes the hydraulic pump 31 that is driven by the prime mover 32 such as an electric motor or an engine, and delivers the hydraulic fluid; and a plurality of hydraulic actuators 5, 12, 20, 21, and 22 that are driven by the hydraulic fluid delivered from the hydraulic pump 31. FIG. 2 illustrates an example of the configuration including only one hydraulic pump 31. However, the following discussion similarly holds also in cases of configurations including two or more hydraulic pumps. In addition, for simplification of the description, FIG. 2 illustrates only hydraulic circuits related to the swing hydraulic motor 5 that makes the upper swing structure 2 perform a swing operation and the boom cylinder 20 and the arm cylinder 21 that operate the boom 17 and the arm 18 in the front work device 3 as hydraulic actuators. Meanwhile, hydraulic circuits related to the travelling hydraulic motor 12 that makes the lower track structure 1 perform a travelling operation and the bucket cylinder 22 that operates the bucket 19 of the front work device 3 are omitted.

The hydraulic pump 31 is a pump of the variable displacement type. The hydraulic pump 31 has a regulator 31*a* that adjusts a pump displacement of the hydraulic pump 31. The regulator 31*a* adjusts the pump displacement according to a command from the controller 80.

The prime mover 32 has a prime mover controller 32*a* that controls the driving of the prime mover 32. The prime mover controller 32*a* is connected to the controller 80 in a manner that allows communication therebetween, and is configured to adjust the revolution speed of the prime mover 32 according to a command from the controller 80. The prime mover controller 32*a* obtains an actual velocity of the prime mover 32 as a sensed value obtained by a velocity sensor not illustrated, and transmits driving information of the prime mover 32 including the obtained velocity to the controller 80.

The boom cylinder 20 and the arm cylinder 21 have first ports 20*p*1 and 21*p*1 and second ports 20*p*2 and 21*p*2 as pairs of input and output ports for the supply and discharge of the hydraulic fluid, and have bottom chambers 20*b* and 21*b* and rod chambers 20*r* and 21*r* as cylinder chambers. The boom cylinder 20 and the arm cylinder 21 are configured to extend when the hydraulic fluid is supplied to the bottom chambers 20*b* and 21*b*, and to contract when the hydraulic fluid is supplied to the rod chambers 20*r* and 21*r*. The swing hydraulic motor 5 has a first port 5*a* (port on the leftward side in FIG. 2) and a second port 5*b* (port on the right side in FIG. 2) as a pair of input and output ports for the supply and discharge of the hydraulic fluid. The swing hydraulic motor 5 is, for example, configured to rotate rightward when the hydraulic fluid is supplied to the first port 5*a*, and to rotate leftward when the hydraulic fluid is supplied to the second port 5*b*.

In the hydraulic system 30 according to the present embodiment, the hydraulic fluid from the hydraulic pump 31 is configured to be supplied to the boom cylinder 20 via a first meter-in control valve 34 and a first directional control valve 35. In addition, the hydraulic fluid from the hydraulic pump 31 is configured to be supplied to the arm cylinder 21 via a second meter-in control valve 36 and a second directional control valve 37. In addition, the hydraulic fluid from the hydraulic pump 31 is configured to be supplied to the swing hydraulic motor 5 via a third meter-in control valve 38 and a third directional control valve 39.

The hydraulic pump 31 is connected to each of the meter-in control valves 34, 36, and 38 and each of the directional control valves 35, 37, and 39 via a delivery line 51. The first directional control valve 35 and the boom cylinder 20 are connected to each other via first actuator lines 53 and 54. The first actuator line 53 is connected to the bottom chamber 20*b* (first port 20*p*1) of the boom cylinder 20, and the first actuator line 54 is connected to the rod chamber 20*r* (second port 20*p*2) of the boom cylinder 20. The second directional control valve 37 and the arm cylinder 21 are connected to each other via second actuator lines 55 and 56. The second actuator line 55 is connected to the bottom chamber 21*b* (first port 21*p*1) of the arm cylinder 21, and the second actuator line 56 is connected to the rod chamber 21*r* (second port 21*p*2) of the arm cylinder 21. The third directional control valve 39 and the swing hydraulic motor 5 are connected to each other via third actuator lines 57 and 58. The third actuator line 57 is connected to the first port 5*a* of the swing hydraulic motor 5, and the third actuator line 58 is connected to the second port 5*b* of the swing hydraulic motor 5.

The meter-in control valves 34, 36, and 38 control flow rates of the hydraulic fluid supplied from the hydraulic pump 31 to the corresponding hydraulic actuators 20, 21, and 5 (which may hereinafter be referred to as meter-in flow rates). Each of the meter-in control valves 34, 36, and 38 is configured to be changed in opening area (that may hereinafter be referred to as a meter-in opening) by the position (stroke amount) thereof being controlled according to a command (for example, a current command value) from the controller 80. In addition, each of the meter-in control valves 34, 36, and 38 has a function of a check valve, and is controlled to be fully closed when the delivery pressure of the hydraulic pump 31 becomes lower than a pressure on the side of each of the hydraulic actuators 20, 21, and 5.

The directional control valves 35, 37, and 39 change flow directions of the hydraulic fluid supplied to the corresponding hydraulic actuators 20, 21, and 5. The directional control valves 35, 37, and 39 are connected to a hydraulic operating fluid tank 41 via a tank line 52, and are configured to return the hydraulic fluid discharged from the corresponding hydraulic actuators 20, 21, and 5, to the hydraulic operating fluid tank 41. The directional control valves 35, 37, and 39 have meter-in passages as passages for making the delivery line 51 communicate with the meter-in sides (hydraulic fluid supply sides) of the respective hydraulic actuators 20, 21, and 5 and meter-out passages as passages for making the meter-out sides (hydraulic fluid discharge sides) of the respective hydraulic actuators 20, 21, and 5 communicate with the hydraulic operating fluid tank 41.

The directional control valves 35, 37, and 39 according to the present embodiment are configured to be able to function as meter-out control valves that control the flow rates of the hydraulic fluid discharged from the corresponding hydraulic actuators 20, 21, and 5 (which may hereinafter be referred to as meter-out flow rates). Each of the directional control valves 35, 37, and 39 is configured to be changed in the opening area of the meter-in passage (which opening area may hereinafter be referred to as a meter-in opening) and changed in the opening area of the meter-out passage (which opening area may hereinafter be referred to as a meter-out opening) by the position (stroke amount) thereof being controlled according to a command (for example, a current command value) from the controller 80. The directional control valves 35, 37, and 39 are, for example, configured such that the meter-in openings are sufficiently large as compared with the opening control ranges of the meter-in control valves 34, 36, and 38. That is, the directional control valves 35, 37, and 39 do not have a function of controlling the meter-in flow rates, and only the meter-in control valves 34, 36, and 38 are configured to have the function of controlling the meter-in flow rates.

A bleed-off valve 42 is provided on a line 59 that is branched from the delivery line 51 and connected to the hydraulic operating fluid tank 41. The bleed-off valve 42 allows the hydraulic fluid delivered from the hydraulic pump 31 to escape to the hydraulic operating fluid tank 41 according to the opening of the bleed-off valve 42. The bleed-off valve 42 thus has a function of adjusting the delivery pressure of the hydraulic pump 31. The bleed-off valve 42 is configured to be changed in opening area by the position (stroke amount) thereof being controlled according to a command (for example, a current command value) from the controller 80. In addition, a main relief valve 43 that has an overload preventing function for the hydraulic circuits is provided on a relief line 60 that is branched from the delivery line 51 and connected to the hydraulic operating fluid tank 41. The main relief valve 43 defines an upper limit of the delivery pressure of the hydraulic pump 31, and is configured to be opened when the delivery pressure of the hydraulic pump 31 exceeds a set pressure.

The delivery line 51 is provided with a delivery pressure sensor 61 that senses the delivery pressure of the hydraulic pump 31. The delivery pressure sensor 61 outputs a sensing signal corresponding to the sensed delivery pressure to the controller 80.

The first actuator lines 53 and 54 are respectively provided with first actuator pressure sensors 62 and 63 (hereinafter referred to as first pressure sensors) that sense pressures on the bottom chamber 20*b* side and the rod chamber 20*r* side of the boom cylinder 20. The second actuator lines 55 and 56 are respectively provided with second actuator pressure sensors 64 and 65 (hereinafter referred to as second pressure sensors) that sense pressures on the bottom chamber 21*b* side and the rod chamber 21*r* side of the arm cylinder 21. The third actuator lines 57 and 58 are respectively provided with third actuator pressure sensors 66 and 67 (hereinafter referred to as third pressure sensors) that sense pressures on the first port 5*a* side and the second port 5*b* side of the swing hydraulic motor 5. The first to third pressure sensors 62 to 67 output sensing signals corresponding to the sensed pressures of the hydraulic actuators 20, 21, and 5 to the controller 80.

The hydraulic excavator has a joystick 6 as an operation device for operating the hydraulic excavator and the revolution speed dial 7 that gives an instruction for the revolution speed of the prime mover 32. The joystick 6 gives instructions for the operation of the front work device 3 (driving of the boom cylinder 20, the arm cylinder 21, and the bucket cylinder 22) and the swing operation of the upper swing structure 2 (driving of the swing hydraulic motor 5). The joystick 6 is of an electric type. The joystick 6 outputs, to the controller 80, an operation signal corresponding to an operation direction (identification of an instruction target) and an operation angle. The revolution speed dial 7 outputs an instruction signal corresponding to a dial position (revolution speed) to the controller 80.

The controller 80 captures the operation signal from the joystick 6, the instruction signal from the revolution speed dial 7, the sensing signal from the delivery pressure sensor 61 (delivery pressure of the hydraulic pump 31), the sensing signals from the first to third pressure sensors 62 to 67 (pressures of the hydraulic actuators 20, 21, and 5), the sensing signals from the first to fifth posture sensors 24 to 28 (the posture information and the operation information of the upper swing structure 2 and the front work device 3), and the driving information (including velocity information) of the prime mover 32 from the prime mover controller 32*a*. The controller 80 performs predetermined computations on the basis of the operation signal, the instruction signal, the sensing signals, and the driving information, and outputs commands corresponding to results of the computations to the regulator 31*a* of the hydraulic pump 31, the meter-in control valves 34, 36, and 38, the directional control valves 35, 37, and 39, the bleed-off valve 42, and the prime mover controller 32*a*.

Figure 3:
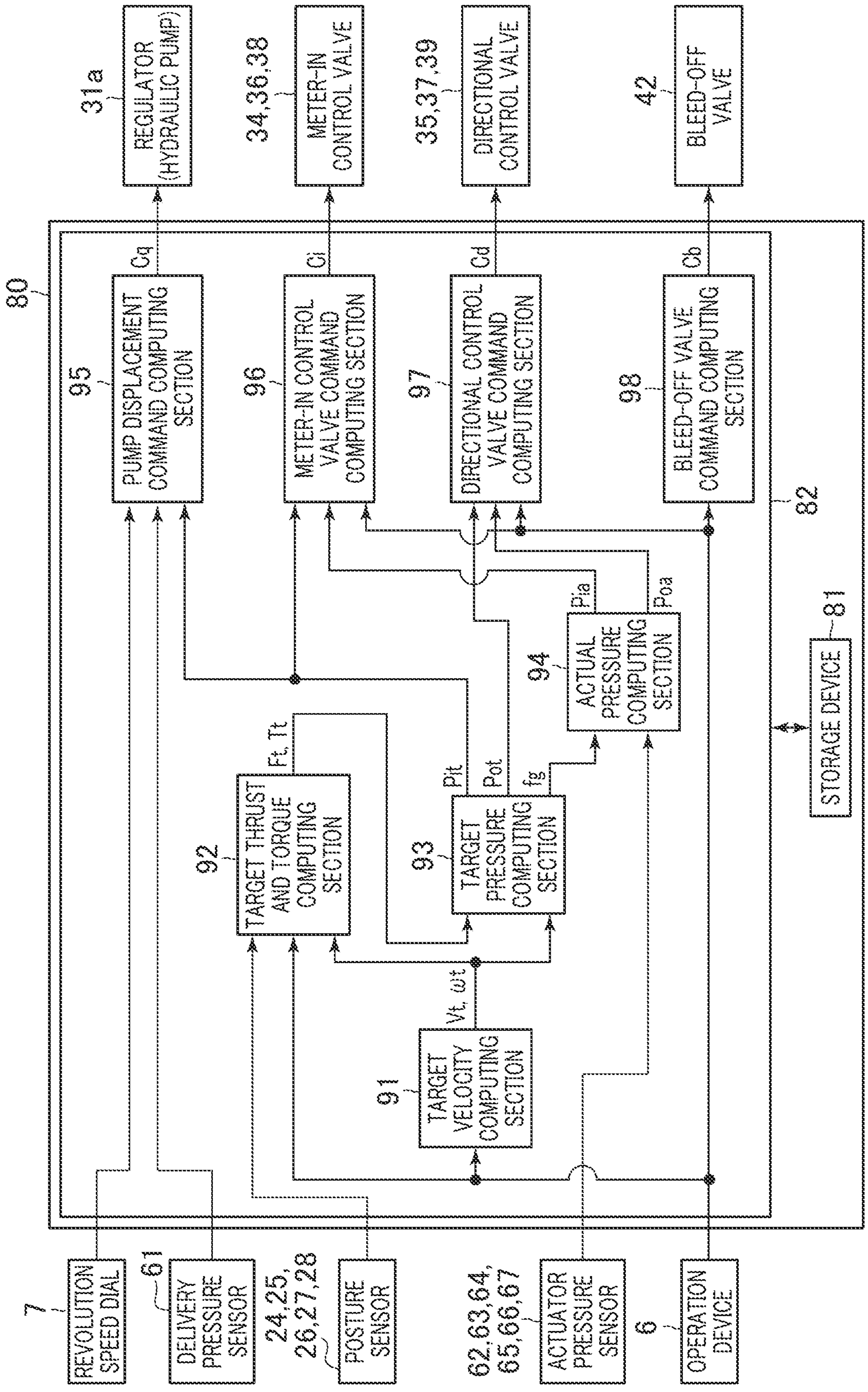
FIG. 3 is a control block diagram of a controller of the work machine according to the first embodiment illustrated in FIG. 2.

Next, an outline of a hardware configuration and a functional configuration of the controller constituting a part of the first embodiment of the work machine according to the present invention will be described with reference to FIG. 3. FIG. 3 is a control block diagram of the controller of the work machine according to the first embodiment illustrated in FIG. 2.

In FIG. 3, the controller 80 includes, as a hardware configuration, for example, a storage device 81 constituted by a RAM (Random Access Memory), a ROM (Read Only Memory), and the like and a processor 82 constituted by a CPU (Central Processing Unit), an MPU (Micro Processing Unit), and the like. The storage device 81 stores, in advance, a program and various kinds of information necessary to control the pump displacement of the hydraulic pump 31, the driving of each of the meter-in control valves 34, 36, and 38, the driving of each of the directional control valves 35, 37, and 39, and the driving of the bleed-off valve 42. The processor 82 implements various kinds of functions by reading the program and the various kinds of information from the storage device 81 as appropriate, and performing processing according to the program.

The controller 80 performs control in such a manner as to maintain the pressures on the meter-in sides of the hydraulic actuators 20, 21, and 5 at a predetermined value or higher while performing velocity control of the hydraulic actuators 20, 21, and 5 according to the operation signal from the operation device 6. The controller 80 according to the present embodiment performs the velocity control of the hydraulic actuators 20, 21, and 5 by pressure control using pressure target values on the meter-in sides and the meter-out sides of the hydraulic actuators 20, 21, and 5. Specifically, the controller 80 includes, as control functional sections, a target velocity computing section 91, a target thrust and torque computing section 92, a target pressure computing section 93, an actual pressure computing section 94, a pump displacement command computing section 95, a meter-in control valve command computing section 96, a directional control valve command computing section 97, and a bleed-off valve command computing section 98.

The target velocity computing section 91 computes target velocities Vt and ωt of the respective hydraulic actuators 20, 21, and 5 according to the operation signal from the operation device 6. The target velocities Vt and ωt of the respective hydraulic actuators 20, 21, and 5 as a computation result are output to the target thrust and torque computing section 92 and the target pressure computing section 93. Details of the computation of the target velocity computing section 91 will be described later.

The target thrust and torque computing section 92 computes thrust or torque of the hydraulic actuators 20, 21, and 5 that is necessary to achieve the target velocities Vt and ωt of the respective hydraulic actuators 20, 21, and 5 as a computation result of the target velocity computing section 91 on the basis of the driven states of the hydraulic actuators 20, 21, 22, and 5. Specifically, target thrust Ft of each of the hydraulic cylinders 20 and 21 and target torque Tt of the hydraulic motor 5 are computed using the operation signal from the operation device 6, the sensing signals from the respective posture sensors 24 to 28 (the posture information and the operation information of the upper swing structure 2 and the front work device 3), and the target velocities Vt and ωt as a computation result of the target velocity computing section 91. The target thrust and torque computing section 92 outputs the target thrust Ft and the target torque Tt of the hydraulic actuators 20, 21, and 5 as a computation result to the target pressure computing section 93. Details of the computation of the target thrust and torque computing section 92 will be described later.

On the basis of the target velocities Vt and ωt of the respective hydraulic actuators 20, 21, and 5 as a computation result of the target velocity computing section 91 and the target thrust Ft and the target torque Tt of the hydraulic actuators 20, 21, and 5 as a computation result of the target thrust and torque computing section 92, the target pressure computing section 93 computes meter-in target pressures Pit as target values of the pressures on the meter-in sides of the hydraulic actuators 20, 21, and 5 and meter-out target pressures Pot as target values of the pressures on the meter-out sides of the hydraulic actuators 20, 21, and 5, and determines the meter-in sides of the hydraulic actuators 20, 21, and 5, to set meter-in flags fg corresponding to a result of the determination. The meter-in flags fg as a determination result are output to the actual pressure computing section 94. The meter-in target pressures Pit of the hydraulic actuators 20, 21, and 5 as a computation result are output to the pump displacement command computing section 95 and the meter-in control valve command computing section 96. The meter-out target pressures Pot of the hydraulic actuators 20, 21, and 5 as a computation result are output to the directional control valve command computing section 97. Details of the computation of the target pressure computing section 93 will be described later.

The actual pressure computing section 94 computes meter-in actual pressures Pia as actual pressures on the meter-in sides of the hydraulic actuators 20, 21, and 5 and meter-out actual pressures Poa as actual pressures on the meter-out sides of the hydraulic actuators 20, 21, and 5 on the basis of the sensing signals of the first to third pressure sensors 62 to 67 (actual pressures of the hydraulic actuators 20, 21, and 5) and the meter-in flags fg of the hydraulic actuators 20, 21, and 5 as a determination result of the target pressure computing section 93. The meter-in actual pressures Pia of the hydraulic actuators 20, 21, and 5 as a computation result are output to the meter-in control valve command computing section 96, and the meter-out actual pressures Poa of the hydraulic actuators 20, 21, and 5 as a computation result are output to the directional control valve command computing section 97. Details of the computation of the actual pressure computing section 94 will be described later.

The pump displacement command computing section 95 computes a displacement command value Cq for commanding the pump displacement of the hydraulic pump 31, on the basis of the instruction signal from the revolution speed dial 7 (demanded revolution speed of the prime mover 32), the sensing signal from the delivery pressure sensor 61 (actual delivery pressure of the hydraulic pump 31), and the meter-in target pressures Pit of the hydraulic actuators 20, 21, and 5 as a computation result of the target pressure computing section 93. The displacement command value Cq as a computation result is output to the regulator 31*a* of the hydraulic pump 31. Details of the computation of the pump displacement command computing section 95 will be described later.

The meter-in control valve command computing section 96 computes meter-in command values Ci for commanding the driving of the meter-in control valves 34, 36, and 38, on the basis of the operation signal from the operation device 6, the meter-in target pressures Pit of the hydraulic actuators 20, 21, and 5 as a computation result of the target pressure computing section 93, and the meter-in actual pressures Pia as a computation result of the actual pressure computing section 94. The meter-in command values Ci as a computation result are output to the meter-in control valves 34, 36, and 38. Details of the computation of the meter-in control valve command computing section 96 will be described later.

The directional control valve command computing section 97 computes meter-out command values Cd for commanding the driving of the respective directional control valves 35, 37, and 39, on the basis of the operation signal from the operation device 6, the meter-out target pressures Pot of the hydraulic actuators 20, 21, and 5 as a computation result of the target pressure computing section 93, and the meter-out actual pressures Poa as a computation result of the actual pressure computing section 94. The meter-out command values Cd as a computation result are output to the respective directional control valves 35, 37, and 39. Details of the computation of the directional control valve command computing section 97 will be described later.

The bleed-off valve command computing section 98 computes a bleed-off command value Cb for commanding the driving of the bleed-off valve 42, according to the operation signal from the operation device 6. The bleed-off command value Cb as a computation result is output to the bleed-off valve 42. Details of the computation of the bleed-off valve command computing section 98 will be described later.

Figure 4:
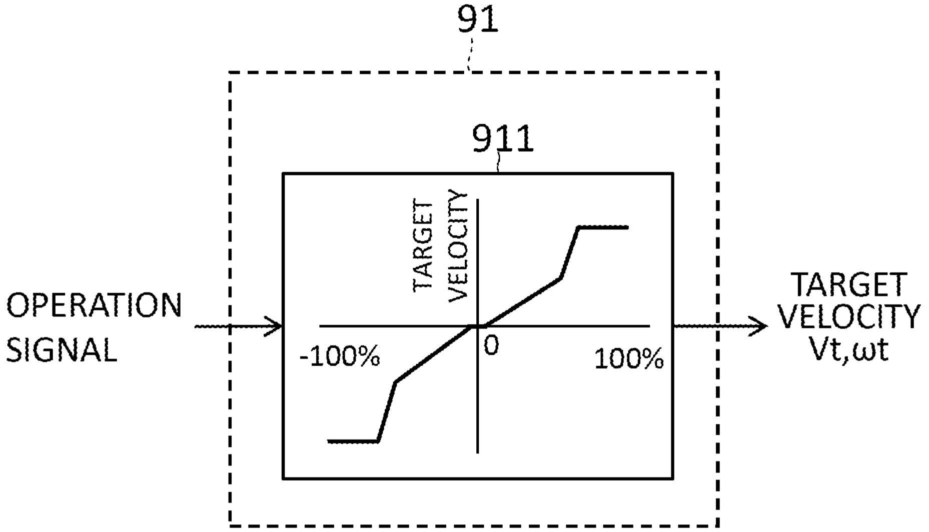
FIG. 4 is a control block diagram of a target velocity computing section in the controller according to the first embodiment illustrated in FIG. 3.

Next, details of the computation of each functional section of the controller in the first embodiment of the work machine according to the present invention will be described with reference to FIGS. 4 to 12. First, details of the computation of the target velocity computing section in the controller will be described with reference to FIG. 4. FIG. 4 is a control block diagram of the target velocity computing section in the controller according to the first embodiment illustrated in FIG. 3.

The target velocity computing section 91 computes the target velocities Vt and ωt of the respective hydraulic actuators on the basis of the operation signal from the operation device 6, by referring to a table 911 illustrated in FIG. 4. The operation signal of the operation device 6 is 0% in a case of non-operation, and is −100% to +100% according to an operation direction and an operation amount. In the table 911, when the hydraulic actuator is a hydraulic cylinder, for example, suppose that a velocity in an extending direction of the hydraulic cylinder is positive and that a velocity in a contracting direction of the hydraulic cylinder is negative. When the hydraulic actuator is a hydraulic motor, for example, suppose that a velocity of rightward rotation of the hydraulic motor is positive and that a velocity of leftward rotation of the hydraulic motor is negative.

Figure 5:
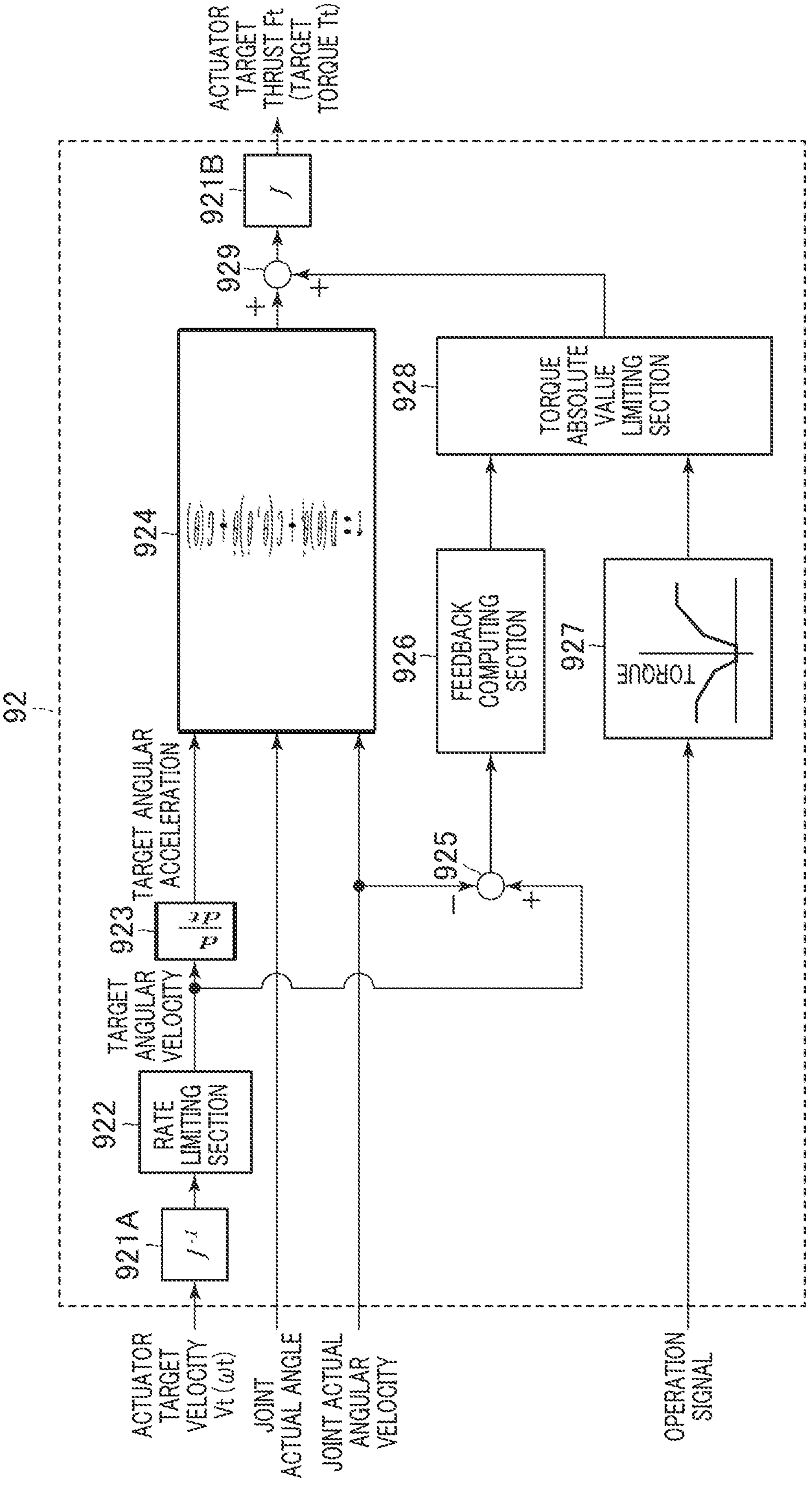
FIG. 5 is a control block diagram of a target thrust and torque computing section in the controller according to the first embodiment illustrated in FIG. 3.

Next, details of the computation of the target thrust and torque computing section in the controller will be described with reference to FIG. 5. FIG. 5 is a control block diagram of the target thrust and torque computing section in the controller according to the first embodiment illustrated in FIG. 3.

The target thrust and torque computing section 92 computes an operation state of the front work device 3 (driven body) in which the target velocities Vt of the hydraulic cylinders 20, 21, and 22 as a computation result of the target velocity computing section 91 can be achieved, in consideration of the inertia (own weight) of the front work device 3. Specifically, as illustrated in FIG. 5, the target thrust and torque computing section 92 has functional sections of a converting section 921A, a rate limiting section 922, a target angular acceleration computing section 923, a demanded torque computing section 924, a deviation computing section 925, a feedback computing section 926, a torque limiting section 927, a torque absolute value limiting section 928, an adding section 929, and a converting section 921B.

The converting section 921A converts the target velocities Vt of the hydraulic cylinders 20, 21, and 22 as a computation result of the target velocity computing section 91 into angular velocities of the respective constituent members 17, 18, and 19 of the front work device 3 or the joint portions 18*a* and 19*a* thereof. The converting section 921A is, for example, a Jacobian inverse matrix for performing conversion from a cylinder coordinate system of the hydraulic cylinders 20, 21, and 22 to an angular coordinate system of the joint portions 18*a* and 19*a*. The converting section 921A outputs the angular velocities as a computation result to the rate limiting section 922.

The rate limiting section 922 limits rates of change (rates) in increase and decrease per unit time of the angular velocities of the joint portions 18*a* and 19*a* (the boom 17, the arm 18, and the bucket 19) of the front work device 3 as a computation result of the converting section 921A. The rate limiting section 922 outputs target angular velocities obtained by limiting the rates of the angular velocities as a computation result of the converting section 921A to the target angular acceleration computing section 923 and the deviation computing section 925. The rate limitation can be set to a predetermined value, or changed according to conditions.

The target angular acceleration computing section 923 computes target angular accelerations of the joint portions 18*a* and 19*a* (the boom 17, the arm 18, and the bucket 19) of the front work device 3 by temporally differentiating the target angular velocities output from the rate limiting section

922. The target angular accelerations as a computation result are output to the demanded torque computing section 924.

The demanded torque computing section 924 computes demanded torque t as torque demanded to set each of the joint portions 18*a* and 19*a* (the boom 17, the arm 18, and the bucket 19) of the front work device 3 in a driving state in which the target angular accelerations as a computation result of the target angular acceleration computing section 923 can be achieved, on the basis of actual angles (posture information) and actual angular velocities (operation information) of the joint portions 18*a* and 19*a* (the boom 17, the arm 18, and the bucket 19) of the front work device 3, the actual angles and the actual angular velocities being the sensed values obtained by the posture sensors 25 to 28 as driven states of the hydraulic actuators 20, 21, 22, and 5. Specifically, the demanded torque computing section 924 calculates the demanded torque t by using the following motion equation of rotary motion.

$$\tau = D(\theta)\ddot{\theta}_t + C(\theta, \dot{\theta})\dot{\theta} + G(\theta)$$

Here, θ denotes the actual angles of the joint portions 18*a* and 19*a* of the boom 17, the arm 18, and the bucket 19 of the front work device 3, θ having a dot mark on an upper side thereof denotes the actual angular velocities of the joint portions 18*a* and 19*a* of the boom 17, the arm 18, and the bucket 19, and θt having a double dot mark on an upper side thereof denotes the target angular accelerations of the joint portions 18*a* and 19*a* of the boom 17, the arm 18, and the bucket 19.

In the above-described motion equation, the posture information and the operation information of the posture sensors 25 to 28 are assigned to θ and θ having the dot mark, and the target angular accelerations as a computation result of the target angular acceleration computing section 923 are assigned to et having the double dot mark. The demanded torque τ is thereby calculated. The demanded torque τ as a computation result is output to the adding section 929.

The deviation computing section 925 computes deviations between the target angular velocities output from the rate limiting section 922 and the actual angular velocities of the joint portions 18*a* and 19*a* (the boom 17, the arm 18, and the bucket 19) of the front work device 3 as the sensed values obtained by the posture sensors 25 to 28. The angular velocity deviations as a computation result are output to the feedback computing section 926.

The feedback computing section 926 computes feedback correction values of target torque according to feedback control such as PI (Proportional Integral) control or PID (Proportional-Integral-Derivative) control, on the basis of the angular velocity deviations as a computation result of the deviation computing section 925. The feedback correction values as a computation result are output to the torque absolute value limiting section 928.

The torque limiting section 927 outputs torque limiting values for the joint portions 18*a* and 19*a* of the constituent members 17, 18, and 19 of the front work device 3 according to the operation signal of the operation device 6, by using a table stored in the storage device 81 in advance. The torque limiting values are output to the torque absolute value limiting section 928.

The torque absolute value limiting section 928 limits the absolute values of the feedback correction values as a computation result of the feedback computing section 926 by the torque limiting values from the torque limiting section 927. The feedback correction values whose absolute values are limited by the torque limiting values are output to the adding section 929.

The adding section 929 computes target torque of each of the joint portions 18*a* and 19*a* (the boom 17, the arm 18, and the bucket 19) of the front work device 3 by adding the feedback correction values output from the torque absolute value limiting section 928 to the demanded torque t as a computation result of the demanded torque computing section 924. The target torque as a computation result is output to the converting section 921B.

The converting section 921B converts the target torque of each of the joint portions 18*a* and 19*a* (the boom 17, the arm 18, and the bucket 19) of the front work device 3 from the adding section 929 into target thrust Ft of each of the hydraulic cylinders 20, 21, and 22. The converting section 921B is an inverse computation of the converting section 921A, and is, for example, a Jacobian matrix for performing conversion from the angular coordinate system of the joint portions 18*a* and 19*a* to the cylinder coordinate system of the hydraulic cylinders 20, 21, and 22.

Incidentally, when the target velocities as a computation result of the target velocity computing section 91 are not those of the hydraulic cylinders 20, 21, and 22 that make the front work device 3 perform operation but are that of the swing hydraulic motor 5 that makes the upper swing structure 2 perform swing operation, each of the functional sections 921A and 921B to 929 described above is changed as follows.

The converting section 921A converts the target velocity ωt of the swing hydraulic motor 5 as a computation result of the target velocity computing section 91 into a swing speed (angular velocity) of the upper swing structure 2. The converting section 921A is, for example, a velocity reduction ratio of rotation of the upper swing structure 2 to rotation of the swing hydraulic motor 5. The converting section 921B is an inverse computation of the converting section 921A. The converting section 921B converts swing target torque of the upper swing structure 2 into target torque of the swing hydraulic motor 5.

The demanded torque computing section 924 uses a motion equation of swing motion of the upper swing structure 2 in place of the motion equation of rotary motion of the joint portions 18*a* and 19*a* of the front work device 3. That is, the demanded torque computing section 924 computes demanded torque τ demanded to achieve a driving state in which a target angular acceleration as a computation result of the target angular acceleration computing section 923 can be achieved by the upper swing structure 2, on the basis of an actual swing angle (actual angle) and an actual swing velocity (actual angular velocity) of the upper swing structure 2 as the sensed values obtained by the posture sensor 24.

Incidentally, the processing of the rate limiting section 922, the target angular acceleration computing section 923, the deviation computing section 925, the feedback computing section 926, the torque limiting section 927, the torque absolute value limiting section 928, and the adding section 929 is similar to that of the above-described case. However, the table of the torque limiting section 927 is changed to one for the hydraulic motor 5.

Next, details of the computation of the target pressure computing section in the controller will be described with reference to FIG. 6 and FIG. 7. FIG. 6 is a table illustrating an example of a computing method of the target pressure computing section in the controller according to the first embodiment illustrated in FIG. 3 (in a case of the hydraulic cylinders). FIG. 7 is a table illustrating another example of the computing method of the target pressure computing section in the controller according to the first embodiment illustrated in FIG. 3 (in a case of the hydraulic motor).

The target pressure computing section 93 performs case classification of conditions of the hydraulic actuators 5, 20, 21, and 22 on the basis of the positive or negative sign of the target velocities Vt and ωt of the hydraulic actuators 5, 20, 21, and 22 from the target velocity computing section 91 and the positive or negative sign of the target thrust Ft and the target torque Tt of the hydraulic actuators 5, 20, 21, and 22 from the target thrust and torque computing section 92. Further, according to the case classification, the meter-in flags fg are set by determining the hydraulic fluid supply sides of the hydraulic actuators 5, 20, 21, and 22, and meter-in target pressures and meter-out target pressures are computed, the meter-in target pressures being target pressures on the hydraulic fluid supply sides of the hydraulic actuators 5, 20, 21, and 22, and the meter-out target pressures being target pressures on the hydraulic fluid discharge sides of the hydraulic actuators 5, 20, 21, and 22. A table 931 is used when the hydraulic actuator is the hydraulic cylinder 20, 21, or 22. A table 932 is used when the hydraulic actuator is the hydraulic motor 5.

As for the case classification of conditions of the hydraulic actuators, as illustrated in the table 931 of FIG. 6 and the table 932 of FIG. 7, for example, a case where the target velocities Vt and ωt of the hydraulic actuators 20, 21, and 5 are positive (equal to or more than 0, to be accurate) and the target thrust Ft or the target torque Tt of the hydraulic actuators 20, 21, and 5 is positive (equal to or more than 0, to be accurate) is assumed to be a case 1. A case where the target velocities Vt and ωt are positive and the target thrust Ft or the target torque Tt is negative is assumed to be a case 2. A case where the target velocities Vt and ωt are negative and the target thrust Ft or the target torque Tt is positive (equal to or more than 0, to be accurate) is assumed to be a case 3. A case where the target velocities Vt and ωt are negative and the target thrust Ft or the target torque Tt is negative is assumed to be a case 4. Incidentally, when the hydraulic actuator is the hydraulic cylinders 20 and 21, thrust in the extending direction of the hydraulic cylinders 20 and 21 is assumed to be positive, and thrust in the contracting direction of the hydraulic cylinders 20 and 21 is assumed to be negative. When the hydraulic actuator is the hydraulic motor 5, torque in a rightward rotational direction of the hydraulic motor 5 is assumed to be positive, and torque in a leftward rotational direction of the hydraulic motor 5 is assumed to be negative.

The table 931 illustrated in FIG. 6 is used when the hydraulic actuator is the hydraulic cylinders 20 and 21. In the case 1, the target velocities Vt of the hydraulic cylinders 20 and 21 are positive (in the extending direction), and thus, the meter-in flags are set to the sides of the bottom chambers 20*b* and 21*b* of the hydraulic cylinders 20 and 21. In the case 1, a cylinder chamber on the meter-out side has a lower pressure than a cylinder chamber on the meter-in side. Accordingly, the meter-out target pressure Pot is set to a lowest pressure Pbf2 at which cavitation does not occur in the cylinder chamber on the meter-out side. The lowest pressure Pbf2 is approximately 1 MPa, for example. The meter-in target pressure Pit is obtained by dividing a sum of thrust on the meter-out side (thrust produced by the set pressure Pbf2) and the target thrust Ft by the cross-sectional area of the cylinder chamber on the meter-in side. In the case 1, the cylinder chamber on the meter-in side is the bottom chambers 20*b* and 21*b*, and the cylinder chamber on the meter-out side is the rod chambers 20*r* and 21*r*. The meter-in target pressure Pit is calculated from the following equation.

$$P_{it} = \frac{F_t + S_r P_{bf2}}{S_b} \qquad \text{[Expression 2]}$$

Here, Sb denotes the cross-sectional areas on the sides of the bottom chambers 20*b* and 21*b* of the hydraulic cylinders 20 and 21, Sr denotes the cross-sectional areas on the sides of the rod chambers 20*r* and 21*r*, and Ft denotes the target thrust of each of the hydraulic cylinders 20 and 21.

Next, in the case 2, the target velocities Vt are positive (in the extending direction), and thus, the meter-in flags are set to the sides of the bottom chambers 20*b* and 21*b*. In the case 2, the cylinder chambers on the meter-in sides of the hydraulic cylinders 20 and 21 have a lower pressure than the cylinder chambers on the meter-out sides thereof. Accordingly, the meter-in target pressure Pit is set to a predetermined pressure Pbf1 at which cavitation does not occur in the cylinder chamber on the meter-in side. The predetermined pressure Pbf1 is a pressure higher than the lowest pressure Pbf2 set in the case 1, and is approximately 3 MPa, for example. Since the meter-in side is an inlet side, and has a high risk of occurrence of cavitation, this is intended to reduce the risk by setting the higher pressure than in the case 1. The meter-out target pressure Pot is obtained by dividing a value obtained by subtracting the target thrust Ft from thrust on the meter-in side (thrust produced by the predetermined pressure Pbf1) by the cross-sectional area of the cylinder chamber on the meter-out side. Here, as in the case 1, the cylinder chamber on the meter-in side is the bottom chambers 20*b* and 21*b*, and the cylinder chamber on the meter-out side is the rod chambers 20*r* and 21*r*. Therefore, the meter-out target pressure Pot is calculated from the following equation.

$$P_{ot} = \frac{-F_t + S_b P_{bf1}}{S_r} \qquad \text{[Expression 3]}$$

Next, in the case 3, the target velocities Vt are negative (in the contracting direction), and thus, the meter-in flags are set to the sides of the rod chambers 20*r* and 21*r* of the hydraulic cylinders 20 and 21. In the case 3, as in the case 2, the cylinder chamber on the meter-in side has a lower pressure than the cylinder chamber on the meter-out side. Accordingly, as in the case 2, the meter-in target pressure Pit is set to the predetermined pressure Pbf1 at which cavitation does not occur in the cylinder chamber on the meter-in side. The meter-out target pressure Pot is obtained by dividing a sum of the thrust on the meter-in side (thrust produced by the predetermined pressure Pbf1) and the target thrust Ft by the cross-sectional area of the cylinder chamber on the meter-out side. Here, unlike in the case 2, the cylinder chamber on the meter-in side is the rod chambers 20*r* and 21*r*, and the cylinder chamber on the meter-out side is the bottom chambers 20*b* and 21*b*. Therefore, the meter-out target pressure Pot is calculated from the following equation.

$$P_{ot} = \frac{F_t + S_r P_{bf1}}{S_b} \qquad \text{[Expression 4]}$$

In the case 4, the target velocities Vt are negative (in the contracting direction), and thus, the meter-in flags are set to the sides of the rod chambers 20*r* and 21*r*. In the case 4, unlike in the case 3, the cylinder chamber on the meter-out side has a lower pressure than the cylinder chamber on the meter-in side. Accordingly, as in the case 1, the meter-out target pressure Pot is set to the lowest pressure Pbf2. The meter-in target pressure Pit is obtained by dividing a value obtained by subtracting the target thrust Ft from the thrust on the meter-out side (thrust produced by the lowest pressure Pbf2) by the cross-sectional area of the cylinder chamber on the meter-in side. Here, as in the case 3, the cylinder chamber on the meter-in side is the rod chambers 20*r* and 21*r*, and the cylinder chamber on the meter-out side is the bottom chambers 20*b* and 21*b*. Therefore, the meter-in target pressure Pit is calculated from the following equation.

$$P_{it} = \frac{-F_t + S_b P_{bf2}}{S_r} \quad \text{[Expression 5]}$$

Incidentally, the target pressure computing section 93 is configured to, for example, output "True" when the meter-in flags indicate the bottom chambers 20*b* and 21*b*, and output "False" when the meter-in flags indicate the rod chambers 20*r* and 21*r*. In addition, an initial value of the meter-in flags is set to be "True." Incidentally, relation between "True" and "False" of the meter-in flags can be set to be opposite.

In addition, the table 932 illustrated in FIG. 7 is used when the hydraulic actuator is the hydraulic motor 5. In the case 1, the target velocity ωt is positive (in the rightward rotational direction), and thus, the meter-in flag is set to the side of the first port 5*a* (rightward rotation). In the case 1, the port on the meter-out side of the hydraulic motor 5 has a lower pressure than the port on the meter-in side thereof. Accordingly, as in the case of the hydraulic cylinders 20 and 21, the meter-out target pressure Pot is set to the lowest pressure Pbf2 at which cavitation does not occur on the meter-out side of the hydraulic motor 5. The meter-in target pressure Pit is obtained by a sum of a computation result of dividing the target torque Tt by a pump displacement qm stored in the storage device 81 in advance and the pressure on the meter-out side of the hydraulic motor 5, that is, the set lowest pressure Pbf2. That is, the meter-in target pressure Pit is calculated from the following equation.

$$P_{it} = \frac{T_t}{q_m} + P_{bf2} \quad \text{[Expression 6]}$$

In the case 2, as in the case 1, the meter-in flag is set to the side of the first port 5*a* (rightward rotation). In the case 2, the port on the meter-in side has a lower pressure than the port on the meter-out side. Accordingly, the meter-in target pressure Pit is set to the predetermined pressure Pbf1 at which cavitation does not occur on the meter-in port side. The port on the meter-in side of the hydraulic motor 5 is an inlet side, and has a high risk of occurrence of cavitation. Thus, as in the case of the hydraulic cylinders 20 and 21, the predetermined pressure Pbf1 is set to be a pressure higher than the lowest pressure Pbf2 set in the case 1. The meter-out target pressure Pot is obtained by subtracting a computation result of dividing the target torque Tt by the pump displacement qm from the pressure on the meter-in side of the hydraulic motor 5, that is, the set predetermined pressure Pbf1. That is, the meter-out target pressure Pot is calculated from the following equation.

$$P_{ot} = \frac{-T_t}{q_m} + P_{bf1} \quad \text{[Expression 7]}$$

In the case 3, the target velocity ωt is negative (in the leftward rotational direction), and thus, the meter-in flag is set to the side of the second port 5*b* (leftward rotation). In the case 3, as in the case 2, the port on the meter-in side has a lower pressure than the port on the meter-out side. Accordingly, as in the case 2, the meter-in target pressure Pit is set to the predetermined pressure Pbf1 at which cavitation does not occur on the port side of the meter-in side. The meter-out target pressure Pot is obtained by a sum of a computation result of dividing the target torque Tt by the pump displacement qm and the pressure on the meter-in side of the hydraulic motor 5, that is, the set predetermined pressure Pbf1. That is, the meter-out target pressure Pot is calculated from the following equation.

$$P_{ot} = \frac{T_t}{q_m} + P_{bf1} \quad \text{[Expression 8]}$$

In the case 4, as in the case 3, the meter-in flag is set to the side of the second port 5*b* (leftward rotation). In the case 4, unlike in the case 3, the port on the meter-out side has a lower pressure than the port on the meter-in side. Accordingly, as in the case 1, the meter-out target pressure Pot is set to the lowest pressure Pbf2. The meter-in target pressure Pit is obtained by subtracting a computation result of dividing the target torque Tt by the pump displacement qm from the pressure on the meter-out side of the hydraulic motor 5, that is, the set lowest pressure Pbf2. That is, the meter-in target pressure Pit is calculated from the following equation.

$$P_{it} = \frac{-T_t}{q_m} + P_{bf2} \quad \text{[Expression 9]}$$

Figure 8:
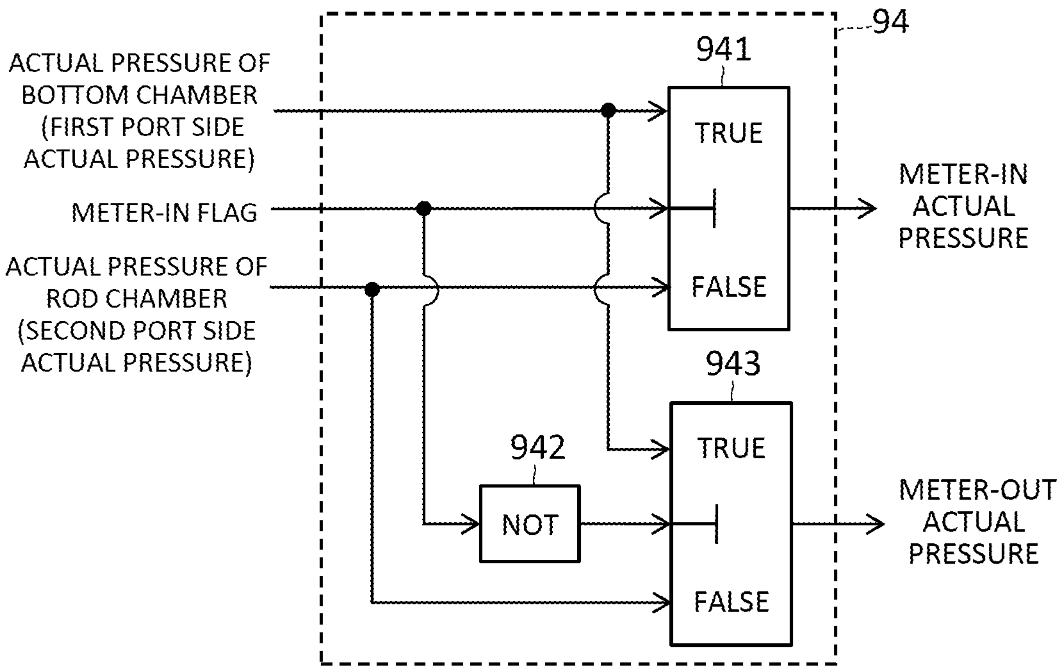
FIG. 8 is a control block diagram of an actual pressure computing section in the controller according to the first embodiment illustrated in FIG. 3.

Next, details of the computation of the actual pressure computing section in the controller will be described with reference to FIG. 8. FIG. 8 is a control block diagram of the actual pressure computing section in the controller according to the first embodiment illustrated in FIG. 3.

As illustrated in FIG. 8, for example, the actual pressure computing section 94 has functional sections of a meter-in selecting section 941, a NOT computing section 942, and a meter-out selecting section 943.

When the hydraulic actuator is the hydraulic cylinders 20 and 21, the meter-in selecting section 941 outputs actual pressures on the meter-in sides of the hydraulic cylinders 20 and 21 on the basis of the sensing signals of the first and second pressure sensors 62 to 65 (actual pressures of the bottom chambers 20*b* and 21*b* and the rod chambers 20*r* and 21*r* of the hydraulic cylinders 20 and 21) and the meter-in flags fg as a processing result of the target pressure computing section 93. That is, when the meter-in flags fg are "True," the actual pressures of the bottom chambers 20*b* and 21*b* of the hydraulic cylinders 20 and 21 are output as actual pressures on the meter-in sides. When the meter-in flags fg are "False," on the other hand, the actual pressures of the rod chambers 20*r* and 21*r* of the hydraulic cylinders 20 and 21 are output as actual pressures on the meter-in sides.

When the hydraulic actuator is the hydraulic motor 5, an actual pressure on the meter-in side of the hydraulic motor 5 is output on the basis of the sensing signals of the third pressure sensors 66 and 67 (actual pressures on the first port 5*a* side and the second port 5*b* side of the swing hydraulic motor 5) and the meter-in flag fg as a processing result of the target pressure computing section 93. That is, when the meter-in flag fg is "True," the actual pressure on the first port 5*a* side of the swing hydraulic motor 5 is output as an actual pressure on the meter-in side. When the meter-in flag fg is "False," on the other hand, the actual pressure on the second port 5*b* side of the swing hydraulic motor 5 is output as an actual pressure on the meter-in side.

The NOT computing section 942 inverts the meter-in flag fg as a processing result of the target pressure computing section 93, and inputs the inverted meter-in flag fg to the meter-out selecting section 943. That is, when the meter-in flag fg is "True," "False" is input to the meter-out selecting section 943. When the meter-in flag fg is "False," on the other hand, "True" is input to the meter-out selecting section 943.

When the hydraulic actuator is the hydraulic cylinders 20 and 21, the meter-out selecting section 943 outputs actual pressures on the meter-out sides of the hydraulic cylinders 20 and 21 on the basis of the sensing signals of the first and second pressure sensors 62 to 65 (actual pressures of the bottom chambers 20*b* and 21*b* and the rod chambers 20*r* and 21*r* of the hydraulic cylinders 20 and 21) and a processing result of the NOT computing section 942 (inversion of the meter-in flags fg). Since the processing result of inversion of the meter-in flags fg by the NOT computing section 942 is input to the meter-out selecting section 943, the meter-out selecting section 943 outputs the actual pressures of the cylinder chambers different from those of the meter-in selecting section 941, that is, the actual pressures on the meter-out sides. In addition, when the hydraulic actuator is the hydraulic motor 5, an actual pressure on the meter-out side of the hydraulic motor 5 is output on the basis of the sensing signals of the third pressure sensors 66 and 67 (actual pressures on the first port 5*a* side and the second port 5*b* side of the swing hydraulic motor 5) and the processing result of the NOT computing section 942.

Figure 9:
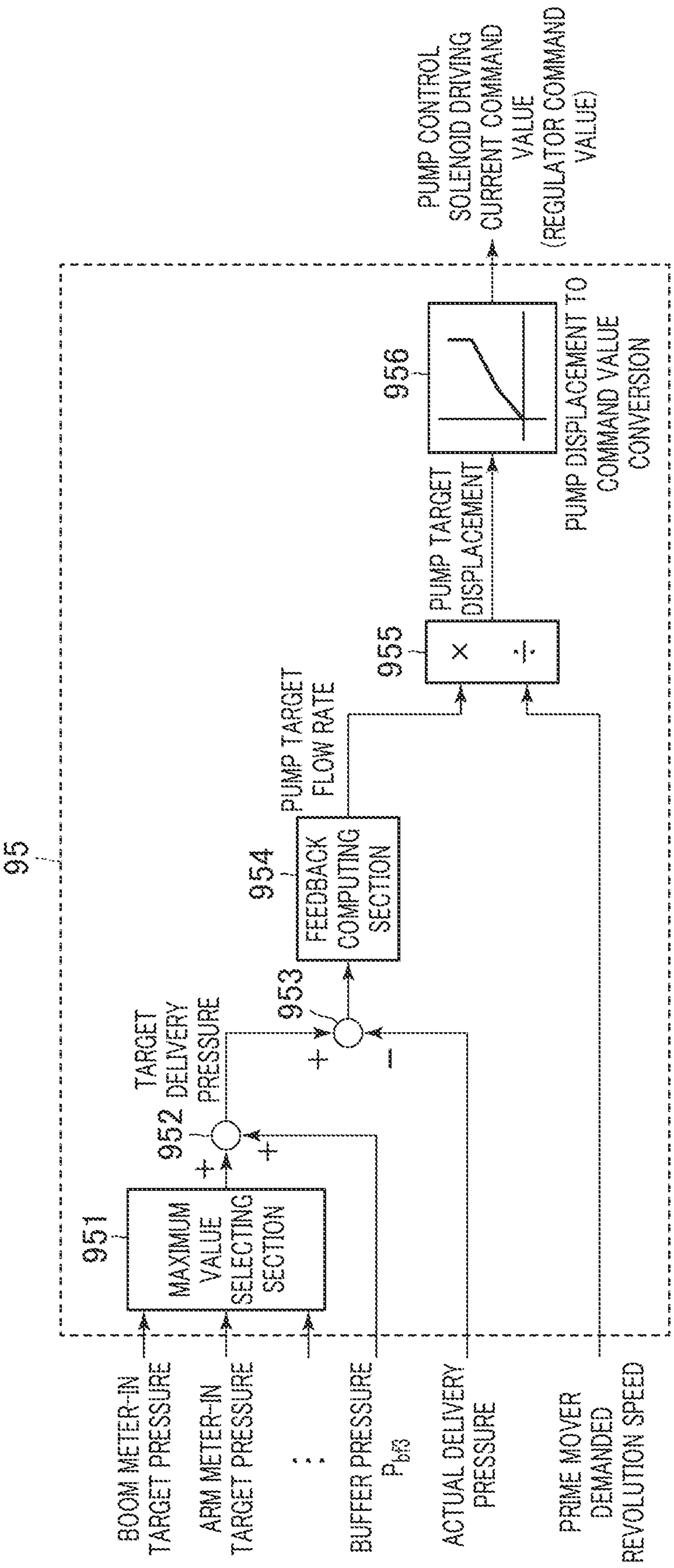
FIG. 9 is a control block diagram of a pump displacement command computing section in the controller according to the first embodiment illustrated in FIG. 3.

Next, details of the computation of the pump displacement command computing section in the controller will be described with reference to FIG. 9. FIG. 9 is a control block diagram of the pump displacement command computing section in the controller according to the first embodiment illustrated in FIG. 3.

In FIG. 9, the pump displacement command computing section 95 has functional sections of a maximum value selecting section 951, an adding section 952, a deviation computing section 953, a feedback computing section 954, a target pump displacement computing section 955, and a command converting section 956.

The maximum value selecting section 951 selects a maximum value of the meter-in target pressures of all of the hydraulic actuators 20, 21, and 5 output from the target pressure computing section 93, and outputs the selected maximum value of the meter-in target pressure to the adding section 952.

The adding section 952 computes a target delivery pressure of the hydraulic pump 31 by adding a buffer pressure Pbf3 to the maximum value of the meter-in target pressures of the hydraulic actuators 20, 21, and 5 output from the maximum value selecting section 951. The buffer pressure Pbf3 is stored in the storage device 81 in advance. The buffer pressure Pbf3 is 1 MPa, for example. The buffer pressure Pbf3 is set in consideration of pressure losses that occur between the hydraulic pump 31 and the hydraulic actuators 20, 21, and 5. This is intended to enhance controllability of meter-in flow rate control on the hydraulic actuators 20, 21, and 5 by increasing the target delivery pressure of the hydraulic pump 31 by an amount corresponding to the pressure losses. The target delivery pressure of the hydraulic pump 31 as a computation result is output to the deviation computing section 953.

The deviation computing section 953 computes a deviation between the target delivery pressure of the hydraulic pump 31 from the adding section 952 and the actual delivery pressure of the hydraulic pump 31 as the sensed value obtained by the delivery pressure sensor 61. The deviation as a computation result is output to the feedback computing section 954.

The feedback computing section 954 computes a target flow rate of the hydraulic pump 31 as a control amount according to feedback control such as PI control or PID control, on the basis of the delivery pressure deviation of the hydraulic pump 31 as a computation result of the deviation computing section 953. The target flow rate of the hydraulic pump 31 as a feedback control amount of a computation result is output to the target pump displacement computing section 955.

The target pump displacement computing section 955 computes a target pump displacement of the hydraulic pump 31 by dividing the pump target flow rate as a computation result of the feedback computing section 954 by the demanded revolution speed of the prime mover 32 (for example, converted on the basis of the instruction signal from the revolution speed dial 7). The target pump displacement of the hydraulic pump 31 as a computation result is output to the command converting section 956.

The command converting section 956 converts the target pump displacement of the hydraulic pump 31 as a computation result of the target pump displacement computing section 955 into a command value (for example, a driving current command value for a pump control solenoid not illustrated). The command converting section 956 outputs the command value to the regulator 31*a* of the hydraulic pump 31.

Figure 10:
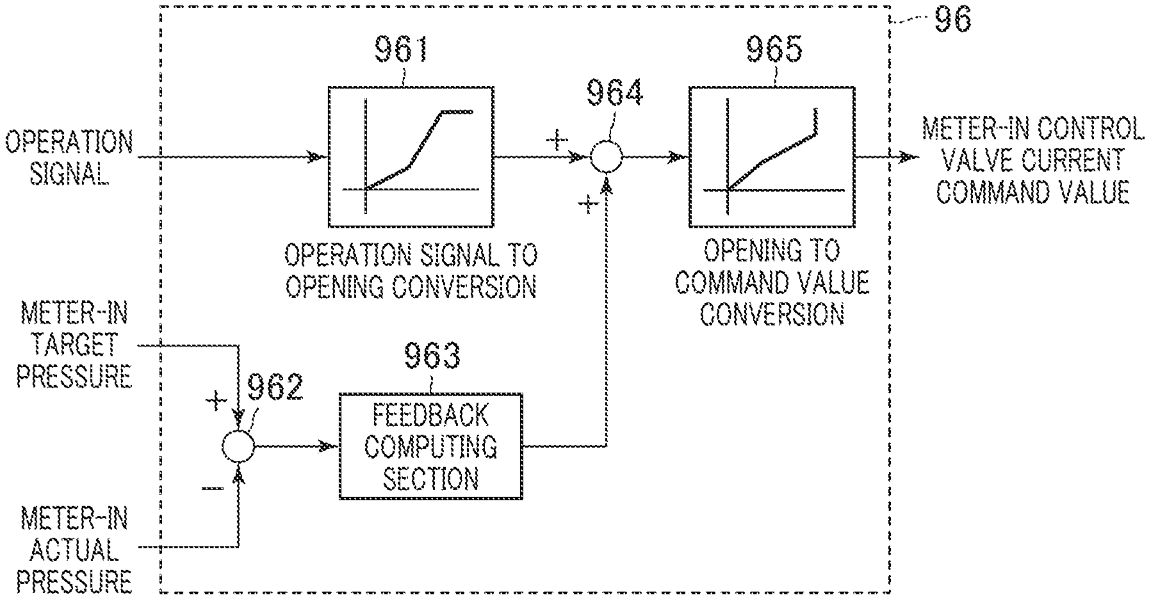
FIG. 10 is a control block diagram of a meter-in control valve command computing section in the controller according to the first embodiment illustrated in FIG. 3.

Next, details of the computation of the meter-in control valve command computing section in the controller will be described with reference to FIG. 10. FIG. 10 is a control block diagram of the meter-in control valve command computing section in the controller according to the first embodiment illustrated in FIG. 3.

In FIG. 10, the meter-in control valve command computing section 96 has functional sections of a meter-in opening converting section 961, a deviation computing section 962, a feedback computing section 963, a meter-in target opening computing section 964, and a command converting section 965.

The meter-in opening converting section 961 computes opening demanded values of the meter-in control valves 34, 36, and 38 on the basis of the operation signal from the operation device 6. The opening demanded values of the meter-in control valves 34, 36, and 38 as a computation result are output to the meter-in target opening computing section 964.

The deviation computing section 962 computes deviations between the meter-in target pressures of the hydraulic actuators 20, 21, and 5 as a computation result of the target pressure computing section 93 and the actual pressures on the meter-in sides of the hydraulic actuators 20, 21, and 5 as a computation result of the actual pressure computing section 94. The pressure deviations as a computation result are output to the feedback computing section 963.

The feedback computing section 963 computes feedback correction values of target openings of the meter-in control valves 34, 36, and 38 according to feedback control such as PI control or PID control, on the basis of the pressure deviations on the meter-in sides of the hydraulic actuators 20, 21, and 5 as a computation result of the deviation computing section 962. The feedback correction values as a computation result are output to the meter-in target opening computing section 964.

The meter-in target opening computing section 964 computes target openings of the meter-in control valves 34, 36, and 38 by adding the feedback correction values as a computation result of the feedback computing section 963 to the opening demanded values as a computation result of the meter-in opening converting section 961. The target openings of the meter-in control valves 34, 36, and 38 as a computation result are output to the command converting section 965.

The command converting section 965 converts the target openings of the meter-in control valves 34, 36, and 38 as a computation result of the meter-in target opening computing section 964 into command values (current command values, for example) for the driving of the meter-in control valves 34, 36, and 38. The command converting section 965 outputs the current command values to solenoids of the meter-in control valves 34, 36, and 38.

Figure 11:
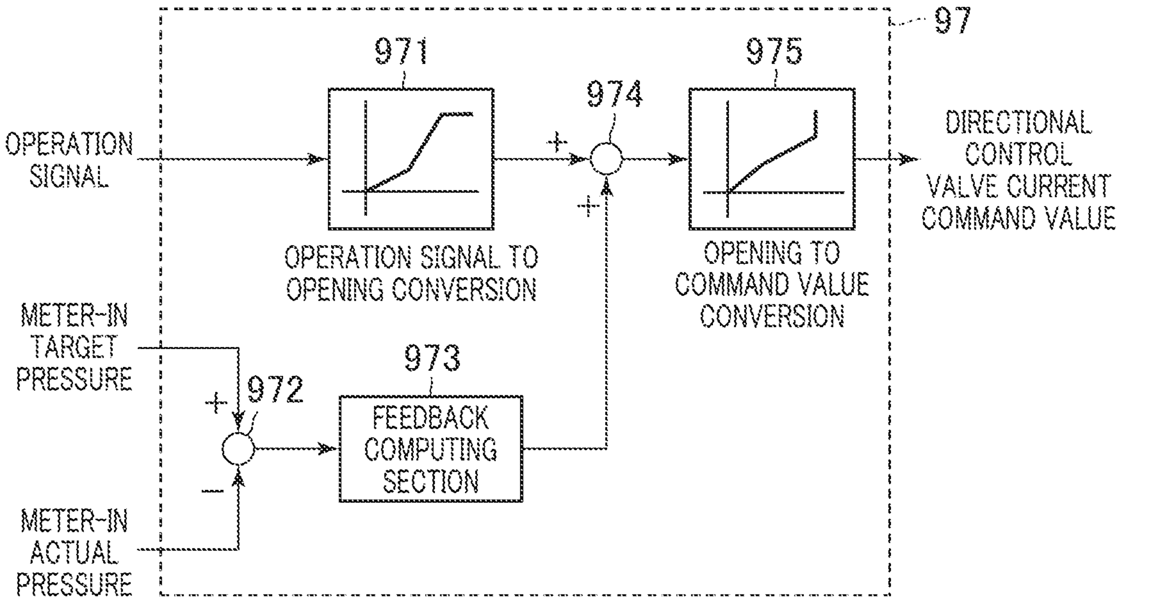
FIG. 11 is a control block diagram of a directional control valve command computing section in the controller according to the first embodiment illustrated in FIG. 3.

Next, details of the computation of the directional control valve command computing section in the controller will be described with reference to FIG. 11. FIG. 11 is a control block diagram of the directional control valve command computing section in the controller according to the first embodiment illustrated in FIG. 3.

In FIG. 11, the directional control valve command computing section 97 computes the meter-out command values Cd for controlling the directional control valves 35, 37, and 39, on the basis of the operation signal from the operation device 6 and the meter-out target pressures Pot of the hydraulic actuators 20, 21, and 5 obtained from the target velocities Vt (ωt) corresponding to the operation signal of the operation device 6. The directional control valve command computing section 97 has functional sections of a meter-out opening converting section 971, a deviation computing section 972, a feedback computing section 973, a meter-out target opening computing section 974, and a command converting section 975.

The meter-out opening converting section 971 computes meter-out opening demanded values of the directional control valves 35, 37, and 39 on the basis of the operation signal of the operation device 6. The meter-out opening demanded values of the directional control valves 35, 37, and 39 as a computation result are output to the meter-out target opening computing section 974.

The deviation computing section 972 computes deviations between the meter-out target pressures of the hydraulic actuators 20, 21, and 5 as a computation result of the target pressure computing section 93 and the actual pressures on the meter-out sides of the hydraulic actuators 20, 21, and 5 as a computation result of the actual pressure computing section 94. The pressure deviations as a computation result are output to the feedback computing section 973.

The feedback computing section 973 computes feedback correction values of meter-out target openings of the directional control valves 35, 37, and 39 according to feedback control such as PI control or PID control, on the basis of the pressure deviations on the meter-out sides of the hydraulic actuators 20, 21, and 5 as a computation result of the deviation computing section 972. The feedback correction values as a computation result are output to the meter-out target opening computing section 974.

The meter-out target opening computing section 974 computes meter-out target openings of the directional control valves 35, 37, and 39 by adding the feedback correction values as a computation result of the feedback computing section 973 to the meter-out opening demanded values as a computation result of the meter-out opening converting section 971. The meter-out target openings of the directional control valves 35, 37, and 39 as a computation result are output to the command converting section 975.

The command converting section 975 converts the meter-out target openings of the directional control valves 35, 37, and 39 as a computation result of the meter-out target opening computing section 974 into command values (current command values, for example) for the driving of the directional control valves 35, 37, and 39. The command converting section 975 outputs the current command values to solenoids of the directional control valves 35, 37, and 39.

Figure 12:
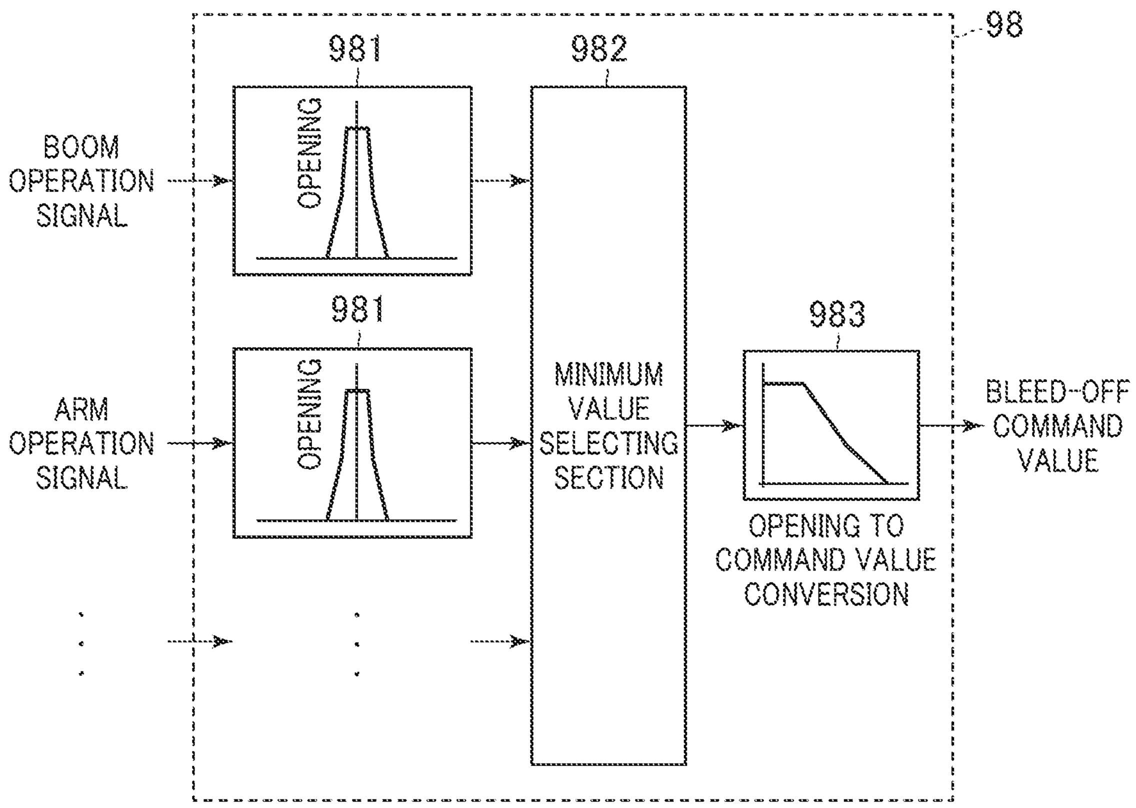
FIG. 12 is a control block diagram of a bleed-off valve command computing section in the controller according to the first embodiment illustrated in FIG. 3.

Next, details of the computation of the bleed-off valve command computing section in the controller will be described with reference to FIG. 12. FIG. 12 is a control block diagram of the bleed-off valve command computing section in the controller according to the first embodiment illustrated in FIG. 3.

In FIG. 12, the bleed-off valve command computing section 98 has functional sections of a bleed-off opening converting section 981, a minimum value selecting section 982, and a command converting section 983.

The bleed-off opening converting section 981 respectively computes opening demanded values of the bleed-off valve 42 for operation signals of respective operations (a boom operation, an arm operation, a swing operation, and the like) from the operation device 6. The opening demanded values of the bleed-off valve 42 for the respective operations as a computation result are each output to the minimum value selecting section 982.

The minimum value selecting section 982 selects a minimum value from among all of the opening demanded values of the bleed-off valve 42 as a computation result of the bleed-off opening converting section 981. The selected minimum opening demanded value of the bleed-off valve 42 is output as a target opening of the bleed-off valve 42 to the command converting section 983.

The command converting section 983 converts the target opening of the bleed-off valve 42 output from the minimum value selecting section 982 into a command value (current command value, for example) for the driving of the bleed-off valve 42. The command converting section 983 outputs the current command value to a solenoid of the bleed-off valve 42.

Figures 13A, 13B, 13C, 13D:
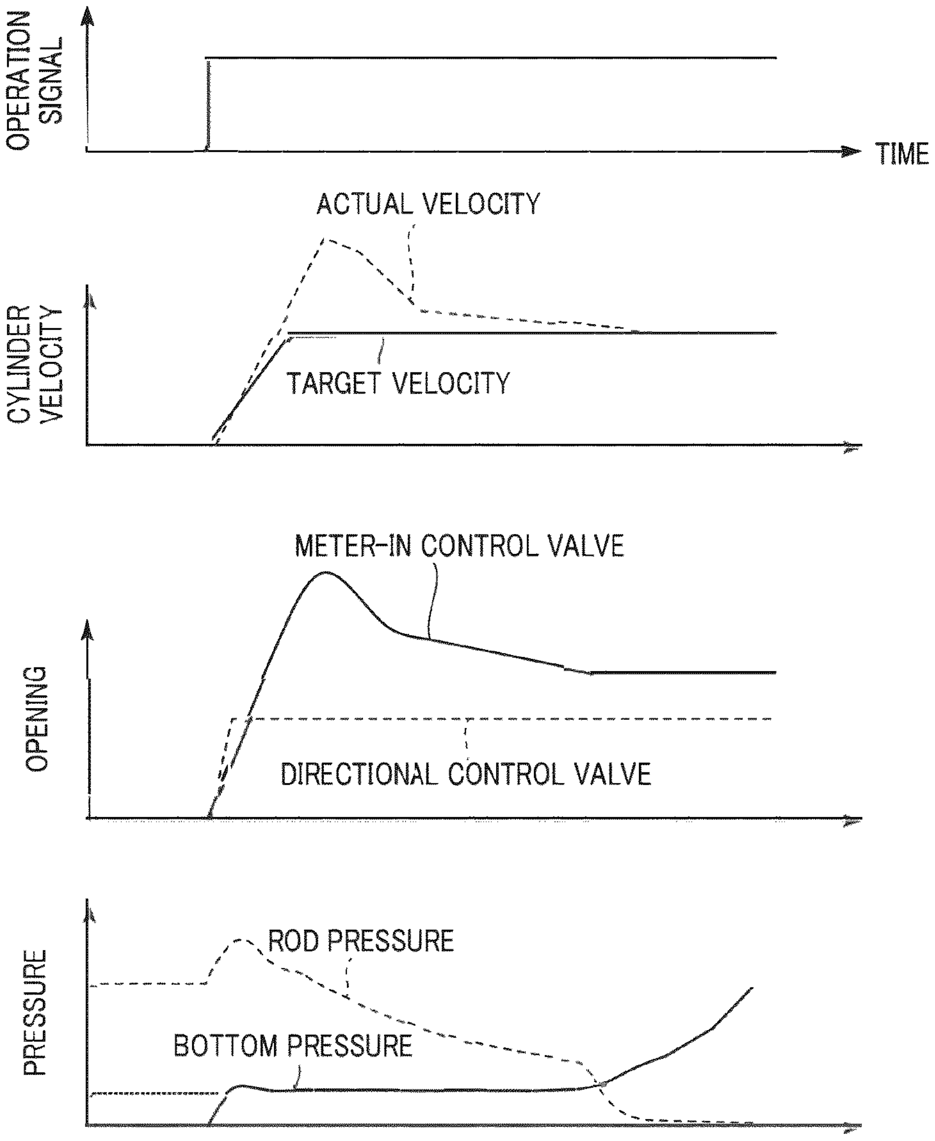
FIGS. 13A to 13D are diagrams illustrating changes in operation states of a hydraulic cylinder, a meter-in control valve, and a directional control valve with respect to an arm crowding operation in a work machine in a publicly known example as a comparative example for the work machine according to the first embodiment.
Figure 14A:
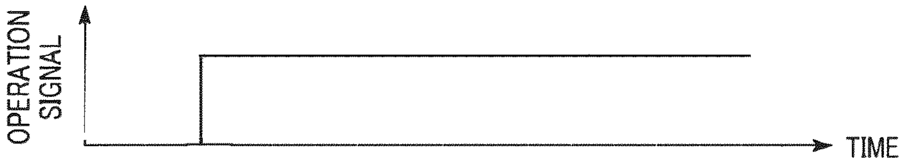
FIGS. 14A to 14D are diagrams illustrating changes in operation states of a hydraulic cylinder, a meter-in control valve, and a directional control valve with respect to an arm crowding operation in the work machine according to the first embodiment.
Figure 14B:
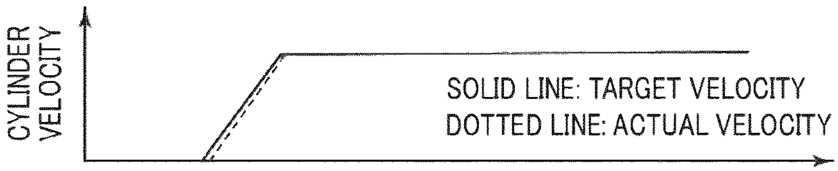
Figure 14C:
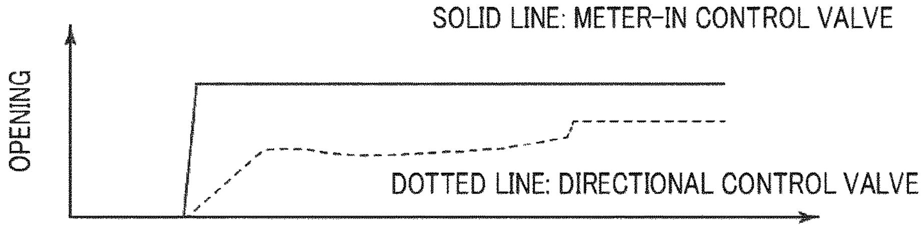
Figure 14D:
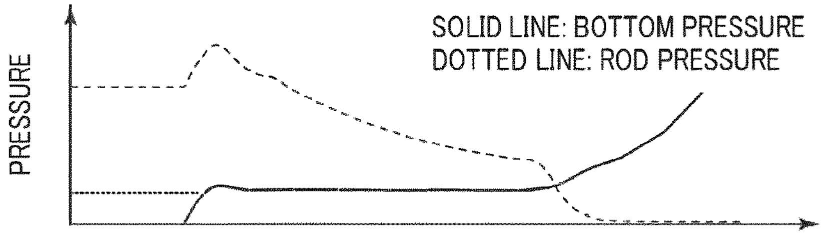

Next, operations and effects of the first embodiment of the work machine according to the present invention will be described by comparison with operations of a work machine in a publicly known example as a comparative example. First, the behavior of a hydraulic cylinder and a meter-in control valve in the work machine according to the comparative example will be described with reference to FIG. 13. FIG. 13 depicts diagrams illustrating changes in operation states of a hydraulic cylinder, a meter-in control valve, and a directional control valve with respect to an arm crowding operation in the work machine in the publicly known example as the comparative example for the work machine according to the first embodiment.

Graphs (A) to (D) illustrated in FIG. 13 represent graphs in a case where a single operation for arm crowding is input to the operation device 6 in a state in which the front work device 3 is held in the air. The graph (A) illustrates temporal changes in the operation signal of the single operation for arm crowding. The graph (B) illustrates changes in the target velocity and actual velocity of the hydraulic cylinder (arm cylinder 21) with respect to the operation signal of the operation device 6. The graph (C) illustrates changes in the openings of the meter-in control valve and the directional control valve with respect to the operation signal of the operation device 6. The graph (D) illustrates changes in the pressure (bottom pressure) of the bottom chamber of the arm cylinder and the pressure (rod pressure) of the rod chamber of the arm cylinder with respect to the operation signal of the operation device 6.

In the work machine according to the publicly known example as the comparative example, at a time of an arm crowding operation, in order to prevent the occurrence of cavitation caused by runaway of the arm cylinder due to the own weight of the front work device, the opening of the meter-in control valve that controls the meter-in flow rate of the arm cylinder is set larger than that in control during a normal time, as indicated by a solid line in the graph (C). Consequently, as indicated by a solid line in the graph (D), the bottom pressure of the arm cylinder is so maintained as to be higher than a pressure at which cavitation occurs.

However, when the opening of the meter-in control valve is increased, the driving speed of the arm cylinder becomes faster than a target velocity corresponding to the operation of the operation device, as indicated by a broken line in the graph (B). Thus, in the work machine according to the comparative example, even when the occurrence of cavitation in the hydraulic actuator can be prevented, it is difficult to perform velocity control corresponding to the operation of the operation device at the same time.

Next, the behavior of the hydraulic cylinder, the meter-in control valve, and the directional control valve in the work machine according to the first embodiment will be described with reference to FIG. 14. FIG. 14 depicts diagrams illustrating changes in operation states of the hydraulic cylinder, the meter-in control valve, and the directional control valve with respect to an arm crowding operation in the work machine according to the first embodiment.

As with the graphs illustrated in FIG. 13, the graphs (A) to (D) illustrated in FIG. 14 illustrate the waveforms of changes in driven states of the hydraulic cylinder, the meter-in control valve, and the directional control valve when a single operation for arm crowding is input to the operation device 6 in a state in which the front work device 3 is held in the air.

In the present embodiment, when the operation signal of the single operation for arm crowding is input, the controller 80 computes the target velocity Vt of the arm cylinder 21 corresponding to the operation signal, and computes the target thrust Ft satisfying the target velocity Vt as a computation result. Further, the meter-in target pressure Pit and the meter-out target pressure Pot of the arm cylinder 21 are computed according to the positive or negative sign of the target velocity Vt and the target thrust Ft as computation results.

A stepped arm crowding operation as the one illustrated in FIG. 14 involves a state corresponding to the case 2 in the table 931 illustrated in FIG. 6. In this case, the pressure target value (meter-in target pressure Pit) of the bottom chamber 21*b* of the arm cylinder 21 is set to the predetermined value Pbf1 at which the occurrence of cavitation can be prevented, whereas the target pressure value (meter-out target pressure Pot) of the rod chamber 21*r* is set according to the target thrust Ft that can achieve the target velocity Vt and the predetermined value Pbf1 on the meter-in side. The controller 80 controls the pump displacement of the hydraulic pump 31, the opening of the meter-in control valve 36, and the meter-out opening of the directional control valve 37 on the basis of the meter-in target pressure Pit and the meter-out target pressure Pot of the arm cylinder 21 as computation results. Specifically, the opening of the meter-in control valve 36 and the pump displacement of the hydraulic pump 31 are controlled such that the pressure (bottom pressure) of the bottom chamber 21*b* as the meter-in side of the arm cylinder 21 becomes equal to or higher than the pressure value Pbf1 (meter-in target pressure Pit) at which cavitation can be prevented, while the meter-out opening of the directional control valve 37 is controlled such that the arm cylinder 21 achieves the target velocity Vt corresponding to the operation of the operation device 6.

That is, as illustrated in the graph (B), the arm cylinder 21 achieves an actual velocity according to the target velocity. At the same time, as indicated by a solid line in the graph (D), the bottom pressure of the arm cylinder 21 does not decrease excessively. The occurrence of cavitation can thus be prevented.

The hydraulic excavator (work machine) according to the first embodiment described above includes the hydraulic actuators 20, 21, 22, and 5 (fluid pressure actuator) that operate the driven bodies 17, 18, 19, 2 by being driven by the supply and discharge of the hydraulic fluid (working fluid), the hydraulic pump 31 (pump) that supplies the hydraulic fluid (working fluid) to the hydraulic actuators 20, 21, 22, and 5 (fluid pressure actuator), the meter-in control valves 34, 36, and 38 capable of controlling flow rates of the hydraulic fluid (working fluid) supplied from the hydraulic pump 31 (pump) to the hydraulic actuators 20, 21, 22, and 5 (fluid pressure actuator), the directional control valves 35, 37, and 39 as meter-out control valves capable of controlling flow rates of the hydraulic fluid (working fluid) discharged from the hydraulic actuators 20, 21, 22, and 5 (fluid pressure actuator), the operation device 6 that outputs the operation signal giving an instruction for the driving of the hydraulic actuators 20, 21, 22, and 5 (fluid pressure actuator), and the controller 80 that controls the hydraulic pump 31 (pump), the meter-in control valves 34, 36, and 38, and the directional control valves 35, 37, and 39 (meter-out control valve). The controller 80 is configured to compute the target velocities Vt and ωt of the hydraulic actuators 20, 21, 22, and 5 (fluid pressure actuator) according to the operation signal from the operation device 6, compute the target thrust Ft or the target torque Tt of the hydraulic actuators 20, 21, 22, and 5 (fluid pressure actuator) on the basis of driven states of the hydraulic actuators 20, 21, 22, and 5 (fluid pressure actuator), and control the velocities of the hydraulic actuators 20, 21, 22, and 5 (fluid pressure actuator) by the directional control valves 35, 37, and 39 (meter-out control valve) on the basis of the operation signal from the operation device 6 and control at least either the hydraulic pump 31 (pump) or the meter-in control valves 34, 36, and 38 such that the pressures on the meter-in sides of the hydraulic actuators 20, 21, 22, and 5 (fluid pressure actuator) are equal to or higher than a predetermined value, when the positive or negative sign of the target velocities Vt and ωt as a computation result is different from the positive or negative sign of the target thrust Ft or the target torque Tt as a computation result.

According to this configuration, when the driven bodies 17, 18, 19, and 2 are operated in an acting direction of inertia, at least either the hydraulic pump 31 (pump) or the meter-in control valves 34, 36, and 38 are controlled such that the pressures on the meter-in sides of the hydraulic actuators 20, 21, 22, and 5 (fluid pressure actuator) are equal to or higher than the predetermined value, while the driving velocities of the hydraulic actuators 20, 21, 22, and 5 (fluid pressure actuator) are controlled by the directional control valves 35, 37, and 39 (meter-out control valve) according to the operation of the operation device 6. Thus, by setting the predetermined value to a value at which the occurrence of cavitation can be avoided, it is possible to prevent the occurrence of cavitation in the hydraulic actuators 20, 21, 22, and 5 (fluid pressure actuator) while implementing the velocity control of the hydraulic actuators 20, 21, 22, and 5 (fluid pressure actuator) according to the operation of the operation device 6.

In addition, the hydraulic excavator (work machine) according to the present embodiment includes the delivery pressure sensor 61 (first pressure sensor) that senses the delivery pressure of the hydraulic pump 31 (pump), and the actuator pressure sensors 62 to 67 (second pressure sensor) that sense the pressures on the meter-in sides of the hydraulic actuators 20, 21, 22, and 5 (fluid pressure actuator). The controller 80 is configured to compute the target thrust Ft or the target torque Tt on the basis of the target velocities Vt and ωt as a computation result. The controller 80 is configured to, when the positive or negative sign of the target velocities Vt as a computation result is different from the positive or negative sign of the target thrust Ft or the target torque Tt as a computation result, set the meter-in target pressures Pit as target values of the pressures on the meter-in sides of the hydraulic actuators 20, 21, 22, and 5 (fluid pressure actuator) to the predetermined value or higher, compute the meter-out target pressures Pot as target values of the pressures on the meter-out sides of the hydraulic actuators 20, 21, 22, and 5 (fluid pressure actuator) on the basis of the target thrust Ft or the target torque Tt as a computation result and the set meter-in target pressures Pit, control the directional control valves 35, 37, and 39 (meter-out control valve) by using the meter-out target pressures Pot as a computation result, control the hydraulic pump 31 (pump) on the basis of the set meter-in target pressures Pit and the sensed value obtained by the delivery pressure sensor 61 (first pressure sensor), and control the meter-in control valves 34, 36, and 38 on the basis of the set meter-in target pressures Pit and the sensed values obtained by the actuator pressure sensors 62 to 67 (second pressure sensor).

According to this configuration, the velocity control of the hydraulic actuators 20, 21, 22, and 5 (fluid pressure actuator) can be performed by pressure control using the pressure target values Pit and Pot on the meter-in sides and the meter-out sides of the hydraulic actuators 20, 21, 22, and 5 (fluid pressure actuator).

In addition, the hydraulic excavator (work machine) according to the present embodiment includes the first to fifth posture sensors 24 to 28 (posture sensor) that sense the posture information of the driven bodies 17, 18, 19, and 2. In addition, the controller 80 is configured to compute the target thrust Ft or the target torque Tt by using sensed information obtained by the first to fifth posture sensors 24 to 28 (posture sensor) as driven states of the hydraulic actuators 20, 21, 22, and 5 (fluid pressure actuator) and the inertia of the driven bodies 17, 18, 19, and 2.

According to this configuration, the target thrust Ft or the target torque Tt of the hydraulic actuators 20, 21, 22, and 5 (fluid pressure actuator) is computed using the sensed information obtained by the first to fifth posture sensors 24 to 28 (posture sensor) and the inertia of the driven bodies 17, 18, 19, and 2. Thus, appropriate velocity control of the hydraulic actuators 20, 21, 22, and 5 (fluid pressure actuator) can be implemented even at a time of constant-velocity motion of the driven bodies 17, 18, 19, and 2 or at a time of decelerating motion thereof.

Second Embodiment

Figure 15:
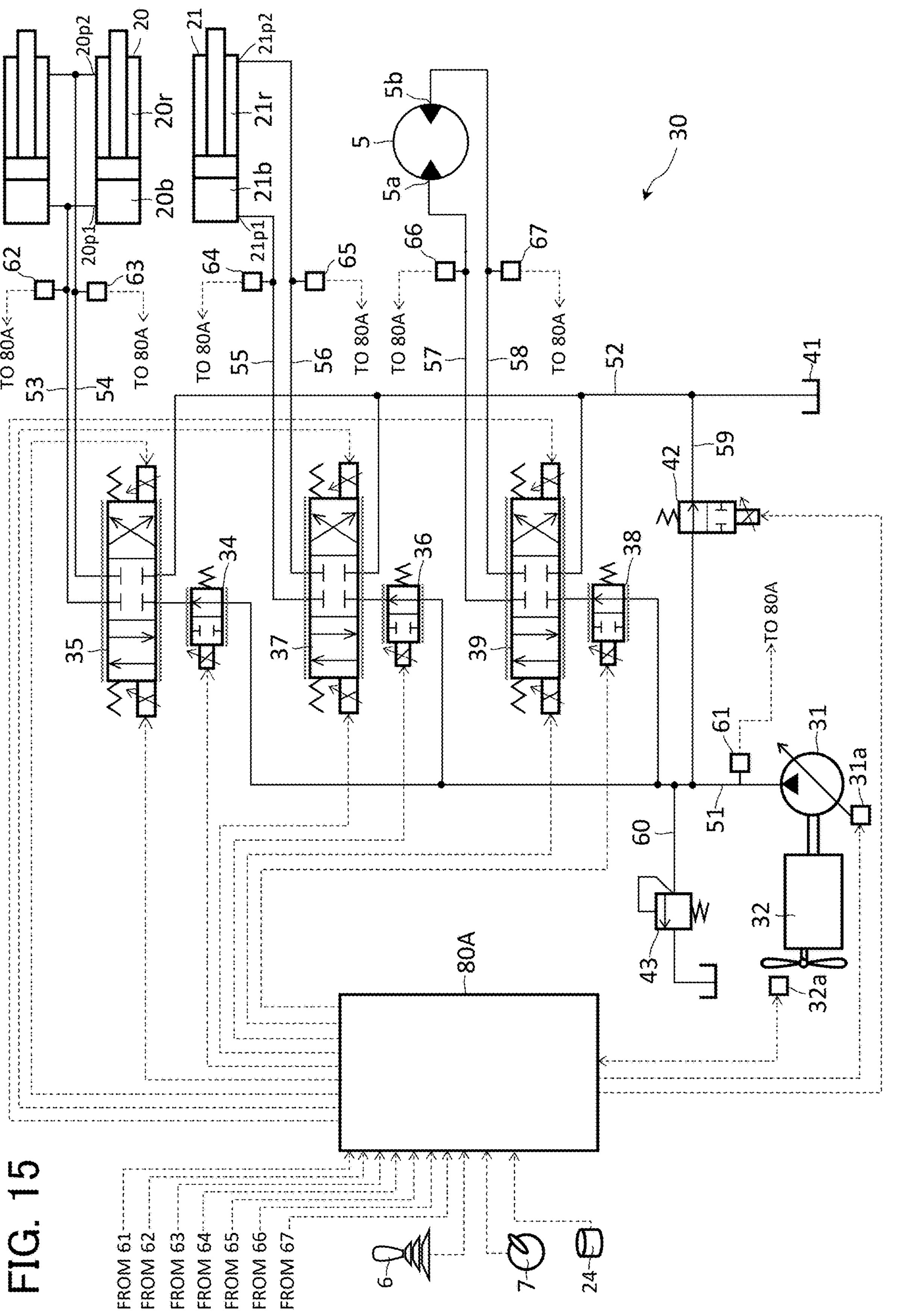
FIG. 15 is a hydraulic circuit diagram illustrating a configuration of a hydraulic system of a work machine according to a second embodiment of the present invention and a diagram illustrating a control system of the hydraulic system.
Figure 16:
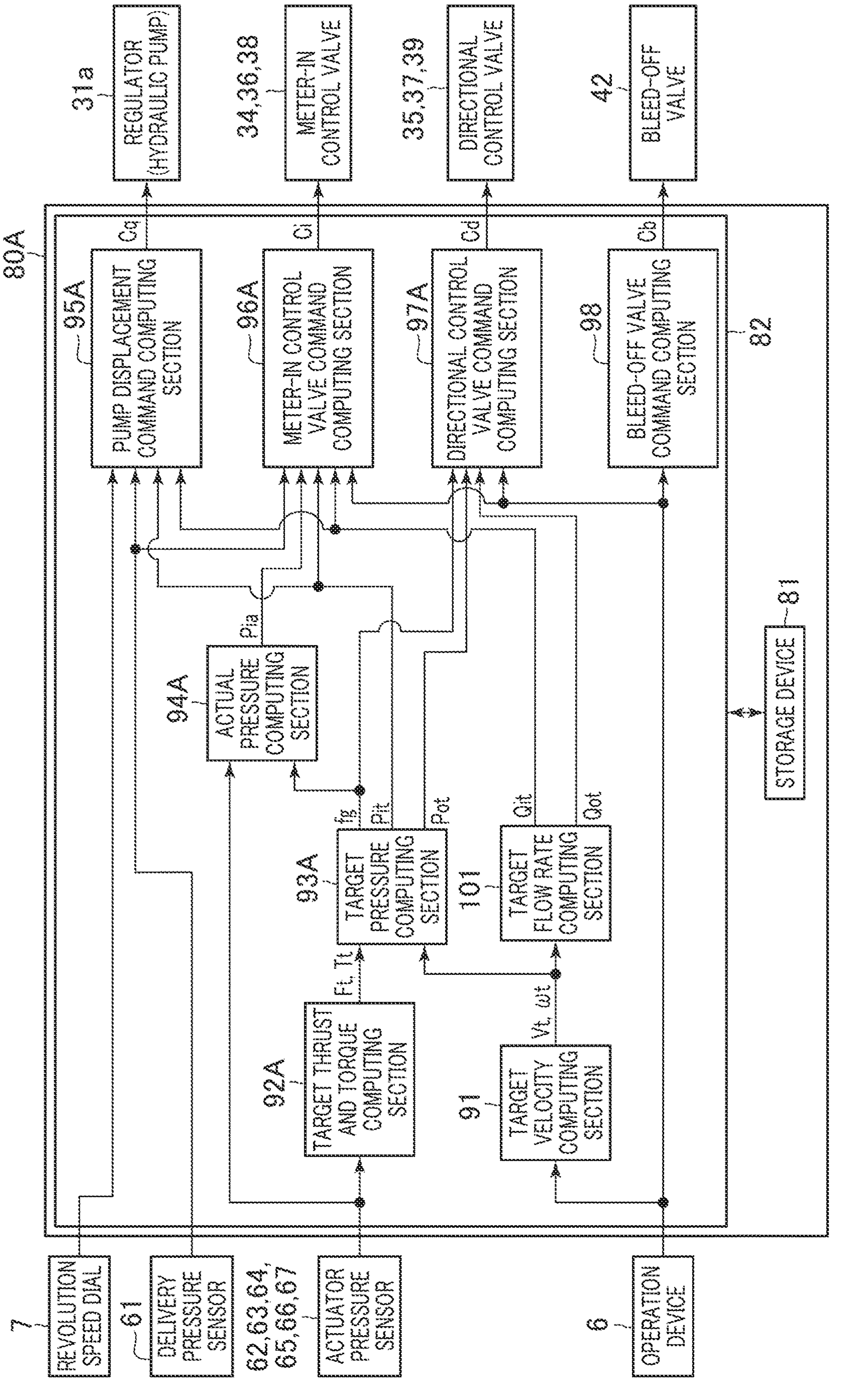
FIG. 16 is a control block diagram of a controller of the work machine according to the second embodiment illustrated in FIG. 15.

Next, the work machine according to a second embodiment of the present invention will be described with reference to FIGS. 15 to 22. In FIGS. 15 to 22, the same reference characters as the reference characters illustrated in FIGS. 1 to 14 represent similar parts, and thus, detailed description thereof will be omitted. FIG. 15 is a hydraulic circuit diagram illustrating a configuration of a hydraulic system of the work machine according to the second embodiment of the present invention and a diagram illustrating a control system of the hydraulic system. FIG. 16 is a control block diagram of a controller of the work machine according to the second embodiment illustrated in FIG. 15.

The second embodiment illustrated in FIG. 15 and FIG. 16 is different from the first embodiment in that the second embodiment obviates a need for the second posture sensor 25 (see FIG. 1 and FIG. 2) that senses the posture information of the upper swing structure 2 and obviates a need for the third to fifth posture sensors 26 to 28 (see FIG. 1 and FIG. 2) that sense the posture information and the operation information of the front work device 3 and in that a method for velocity control of the hydraulic actuators 20, 21, and 5 by a controller 80A is different according to the omission of the second to fifth posture sensors 25 to 28.

As with the controller 80 according to the first embodiment, the controller 80A according to the present embodiment performs control in such a manner as to maintain the pressures on the meter-in sides of the hydraulic actuators 20, 21, and 5 to a predetermined value or higher while performing velocity control of the hydraulic actuators 20, 21, and 5 according to the operation signal from the operation device 6. Unlike in the first embodiment, the controller 80A according to the present embodiment performs velocity control of the hydraulic actuators 20, 21, and 5 by flow rate control using flow rate target values on the meter-out sides of the hydraulic actuators 20, 21, and 5.

Specifically, the controller 80A illustrated in FIG. 16 has a target flow rate computing section 101 in addition to functional sections of the target velocity computing section 91, a target thrust and torque computing section 92A, a target pressure computing section 93A, an actual pressure computing section 94A, a pump displacement command computing section 95A, a meter-in control valve command computing section 96A, a directional control valve command computing section 97A, and the bleed-off valve command computing section 98. The target velocity computing section 91 and the bleed-off valve command computing section 98 are functional sections that perform computation processing similar to that in the case of the controller 80 according to the first embodiment, and thus, description of the computation processing will be omitted. However, the target velocity computing section 91 outputs the target velocities Vt and ωt of the hydraulic actuators 20, 21, and 5 as a computation result to the target pressure computing section 93A and the target flow rate computing section 101.

The target thrust and torque computing section 92A computes the target thrust Ft or the target torque Tt of the hydraulic actuators 20, 21, and 5 on the basis of the sensed values obtained by the first to third pressure sensors 62 to 67 (actual pressures of the hydraulic actuators 20, 21, and 5) as driven states of the hydraulic actuators 20, 21, 22, and 5. The computation of the target thrust and torque computing section 92A is different from that in the first embodiment in that the computation of the target thrust and torque computing section 92A calculates the target thrust Ft or the target torque Tt of the hydraulic actuators 20, 21, and 5 directly from the sensed values obtained by the actuator pressure sensors 62 to 67 (actual load pressures of the hydraulic actuators 20, 21, and 5) without using the computation of the motion equation for the driven bodies of the front work device 3 and the upper swing structure 2. That is, the target thrust and torque computing section 92A sets, as the target thrust Ft or the target torque Tt, the thrust or torque of the hydraulic actuators 20, 21, and 5 that can cancel out external forces or external torque calculated from the actual load pressures (sensed values of the first to third pressure sensors 62 to 67) that act on the hydraulic actuators 20, 21, and 5. The target thrust Ft or the target torque Tt of the hydraulic actuators 20, 21, and 5 as a computation result is output to the target pressure computing section 93A.

Specifically, the target thrust and torque computing section 92A calculates the target thrust Ft of the hydraulic cylinders 20 and 21 from the following Computation Equation (1), and calculates the target torque Tt of the hydraulic motor 5 from the following Computation Equation (2).

$$Ft = Pb \cdot Sb - Pr \cdot Sr \qquad \text{Equation (1)}$$

Here, Pb denotes the actual pressures (actual bottom pressures) of the bottom chambers 20*b* and 21*b* of the hydraulic cylinders 20 and 21. Pr denotes the actual pressures (actual rod pressures) of the rod chambers 20*r* and 21*r*. Sb denotes the cross-sectional areas of the bottom chambers 20*b* and 21*b* of the hydraulic cylinders 20 and 21. Sr denotes the cross-sectional areas of the rod chambers 20*r* and 21*r*. Incidentally, the target thrust Ft of each of the hydraulic cylinders 20 and 21 is assumed to be positive in the extending direction, and is assumed to be negative in the contracting direction.

The target thrust Ft is calculated by inputting the sensed values obtained by the pressure sensors 62 and 64 to Pb and inputting the sensed values obtained by the pressure sensors 63 and 65 to Pr. The cross-sectional areas Sb and Sr are stored in the storage device 81 in advance.

$$Tt = (PA - PB) \cdot qm \qquad \text{Equation (2)}$$

Here, PA denotes the actual pressure on the first port 5*a* side of the hydraulic motor 5, and PB denotes the actual pressure on the second port 5*b* side of the hydraulic motor 5. qm denotes the pump displacement of the hydraulic pump 31. Incidentally, the target torque Tt of the hydraulic motor 5 is assumed to be positive in a case where the first port 5*a* side has a high pressure (rightward rotation), and the target torque Tt is assumed to be negative in a case where the second port 5*b* side has a high pressure (leftward rotation).

The target torque Tt is calculated by inputting the sensed value obtained by the pressure sensor 66 to PA and inputting the sensed value obtained by the pressure sensor 67 to PB. The pump displacement qm is stored in the storage device 81 in advance.

As illustrated in FIG. 16, the target flow rate computing section 101 computes target flow rates Qt of the hydraulic actuators 20, 21, and 5 on the basis of the target velocities Vt and ωt of the hydraulic actuators 20, 21, and 5 as a computation result of the target velocity computing section 91. Specifically, when the hydraulic actuator is the hydraulic cylinders 20 and 21, the target flow rate computing section 101 calculates meter-in target flow rates Qit as target values of the flow rates on the meter-in sides of the hydraulic cylinders 20 and 21 and meter-out target flow rates Qot as target values of the flow rates on the meter-out sides of the hydraulic cylinders 20 and 21 from the following Computation Equations (3) and (4).

$$Qit = Sb \cdot Vt(Vt \geq 0) \qquad \text{Equation (3)}$$

$$Qit = -Sr \cdot Vt(Vt < 0) \qquad \text{Equation (3)}$$

$$Qot = Sr \cdot Vt(Vt \geq 0) \qquad \text{Equation (4)}$$

$$Qot = -Sb \cdot Vt(Vt < 0) \qquad \text{Equation (4)}$$

Here, Sb denotes the cross-sectional areas of the bottom chambers 20*b* and 21*b* of the hydraulic cylinders 20 and 21, and Sr denotes the cross-sectional areas of the rod chambers 20*r* and 21*r*. Incidentally, the target velocities Vt of the hydraulic cylinders 20 and 21 are assumed to be positive in the extending direction, and are assumed to be negative in the contracting direction.

In addition, when the hydraulic actuator is the hydraulic motor 5, the meter-in target flow rate Qit and the meter-out target flow rate Qot of the hydraulic motor 5 are calculated from the following Computation Equations (5) and (6).

[Expression 10]

$$Q_{it}=q_m\|\omega t\| \qquad \text{Equation (5)}$$

[Expression 11]

$$Q_{ot}=q_m\|\omega t\| \qquad \text{Equation (6)}$$

Here, qm denotes the pump displacement of the hydraulic pump 31, and ωt denotes the target velocity of the hydraulic motor 5.

Next, details of the computation of the target pressure computing section in the present embodiment will be described with reference to FIGS. 16 to 18. FIG. 17 is a table illustrating an example of a computing method of the target pressure computing section in the controller according to the second embodiment illustrated in FIG. 16 (in a case of the hydraulic cylinders). FIG. 18 is a table illustrating another example of the computing method of the target pressure computing section in the controller according to the second embodiment illustrated in FIG. 16 (in a case of the hydraulic motor).

As illustrated in FIG. 16, on the basis of the target velocities Vt and ωt of the hydraulic actuators 20, 21, and 5 as a computation result of the target velocity computing section 91 and the target thrust Ft and the target torque Tt of the hydraulic actuators 20, 21, and 5 as a computation result of the target thrust and torque computing section 92A, the target pressure computing section 93A computes the meter-in target pressures Pit and the meter-out target pressures Pot of the hydraulic actuators 20, 21, and 5, and determines the meter-in sides of the hydraulic actuators 20, 21, and 5 to set the meter-in flags fg corresponding to a result of the determination. The meter-in flags fg as a determination result are output to the actual pressure computing section 94A. The meter-in target pressures Pit of the hydraulic actuators 20, 21, and 5 as a computation result are output to the pump displacement command computing section 95A and the meter-in control valve command computing section 96A. The meter-out target pressures Pot of the hydraulic actuators 20, 21, and 5 as a computation result are output to the directional control valve command computing section 97A.

As illustrated in FIG. 17 and FIG. 18, as in the case of the first embodiment, the target pressure computing section 93A performs case classification of conditions of the hydraulic actuators 5, 20, and 21 on the basis of the positive or negative sign of the target velocities Vt and ωt of the hydraulic actuators 5, 20, and 21 from the target velocity computing section 91 and the positive or negative sign of the target thrust Ft and the target torque Tt of the hydraulic actuators 5, 20, and 21 from the target thrust and torque computing section 92A. Further, according to the case classification, the meter-in flags fg are set by determining the hydraulic fluid supply sides of the hydraulic actuators 5, 20, and 21, and the meter-in target pressures Pit and the meter-out target pressures Pot of the hydraulic actuators 5, 20, and 21 are computed.

The case classification of the conditions of the hydraulic actuators is similar to that in the case of the first embodiment, and thus, description thereof will be omitted (see FIG. 17 and FIG. 18). When the hydraulic actuator is the hydraulic cylinders 20 and 21, a table 931A illustrated in FIG. 17 is used. In the case 2 and the case 3, as in the case of the target pressure computing section 93 in the first embodiment, the meter-in target pressure Pit is set to the predetermined pressure Pbf1 at which cavitation does not occur. As illustrated in the table 931A of FIG. 17, a computation equation for the meter-out target pressure Pot is also similar to that in the case of the first embodiment (see FIG. 6). However, the target thrust Ft is a computation result of the target thrust and torque computing section 92A.

On the other hand, in the case 1, the meter-in target pressure Pit is set to a bottom pressure Pb or the predetermined pressure Pbf1, whichever is higher, the bottom pressure Pb being the meter-in actual pressures of the hydraulic cylinders 20 and 21 as the sensed values obtained by the pressure sensors 62 and 64 and used in the computation of the target thrust and torque computing section 92A. In the case 4, as in the case 1, the meter-in target pressure Pit is set to a rod pressure Pr or the predetermined pressure Pbf1, whichever is higher, the rod pressure Pr being the actual pressures on the meter-in sides of the hydraulic cylinders 20 and 21 as the sensed values obtained by the pressure sensors 63 and 65 and used in the computation of the target thrust and torque computing section 92A.

In addition, when the hydraulic actuator is the hydraulic motor 5, a table 932A illustrated in FIG. 18 is used. In the case 2 and the case 3, as in the case of the target pressure computing section 93 in the first embodiment, the meter-in target pressure Pit is set to the predetermined pressure Pbf1 at which cavitation does not occur. As illustrated in the table 932A of FIG. 18, a computation equation for the meter-out target pressure Pot is also similar to that in the case of the first embodiment (see FIG. 7). However, the target torque Tt is a computation result of the target thrust and torque computing section 92A.

In contrast, in the case 1, the meter-in target pressure Pit is set to the actual pressure PA on the first port 5*a* side or the predetermined pressure Pbf1, whichever is higher, the actual pressure PA being the actual pressure on the meter-in side of the hydraulic motor 5 as the sensed value obtained by the third pressure sensor 66 and used in the computation of the target thrust and torque computing section 92A. In the case 4, as in the case 1, the meter-in target pressure value Pit is set to the actual pressure PB of the second port 5*b* or the predetermined pressure Pbf1, whichever is higher, the actual pressure PB being the actual pressure on the meter-in side as the sensed value obtained by the third pressure sensor 67 and used in the computation of the target thrust and torque computing section 92A.

Figure 19:
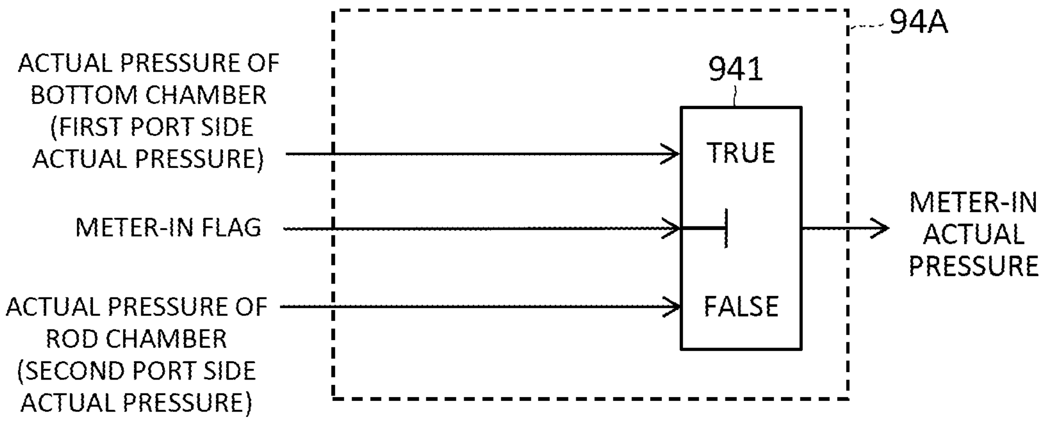
FIG. 19 is a control block diagram of an actual pressure computing section in the controller according to the second embodiment illustrated in FIG. 16.

Next, details of the computation of the actual pressure computing section according to the present embodiment will be described with reference to FIG. 16 and FIG. 19. FIG. 19 is a control block diagram of the actual pressure computing section in the controller according to the second embodiment illustrated in FIG. 16.

As illustrated in FIG. 16, the actual pressure computing section 94A computes the actual pressures Pia on the meter-in sides of the hydraulic actuators 20, 21, and 5 on the basis of the sensing signals of the first to third pressure sensors 62 to 67 (actual pressures of the hydraulic actuators 20, 21, and 5) and the meter-in flags fg as a processing result of the target pressure computing section 93A. Specifically, a difference between the functional sections of the actual pressure computing section 94A according to the present embodiment and the actual pressure computing section 94 according to the first embodiment lies in that the actual pressure computing section 94A has only the meter-in selecting section 941, as illustrated in FIG. 19. Specifically, when the hydraulic actuator is the hydraulic cylinders 20 and 21, and when the meter-in flags fg are "True," the actual pressure computing section 94A outputs the actual pressures of the bottom chambers 20*b* and 21*b* of the hydraulic cylinders 20 and 21 (sensed values obtained by the pressure sensors 62 and 64) as actual pressures on the meter-in sides. When the meter-in flags fg are "False," on the other hand, the actual pressures of the rod chambers 20*r* and 21*r* of the hydraulic cylinders 20 and 21 (sensed values obtained by the pressure sensors 63 and 65) are output as actual pressures on the meter-in sides. When the hydraulic actuator is the hydraulic motor 5, and when the meter-in flag fg is "True," the actual pressure on the first port 5*a* side of the swing hydraulic motor 5 (sensed value obtained by the third pressure sensor 66) is output as an actual pressure on the meter-in side. When the meter-in flag fg is "False," on the other hand, the actual pressure on the second port 5*b* side of the swing hydraulic motor 5 (sensed value obtained by the third pressure sensor 67) is output as an actual pressure on the meter-in side.

Figure 20:
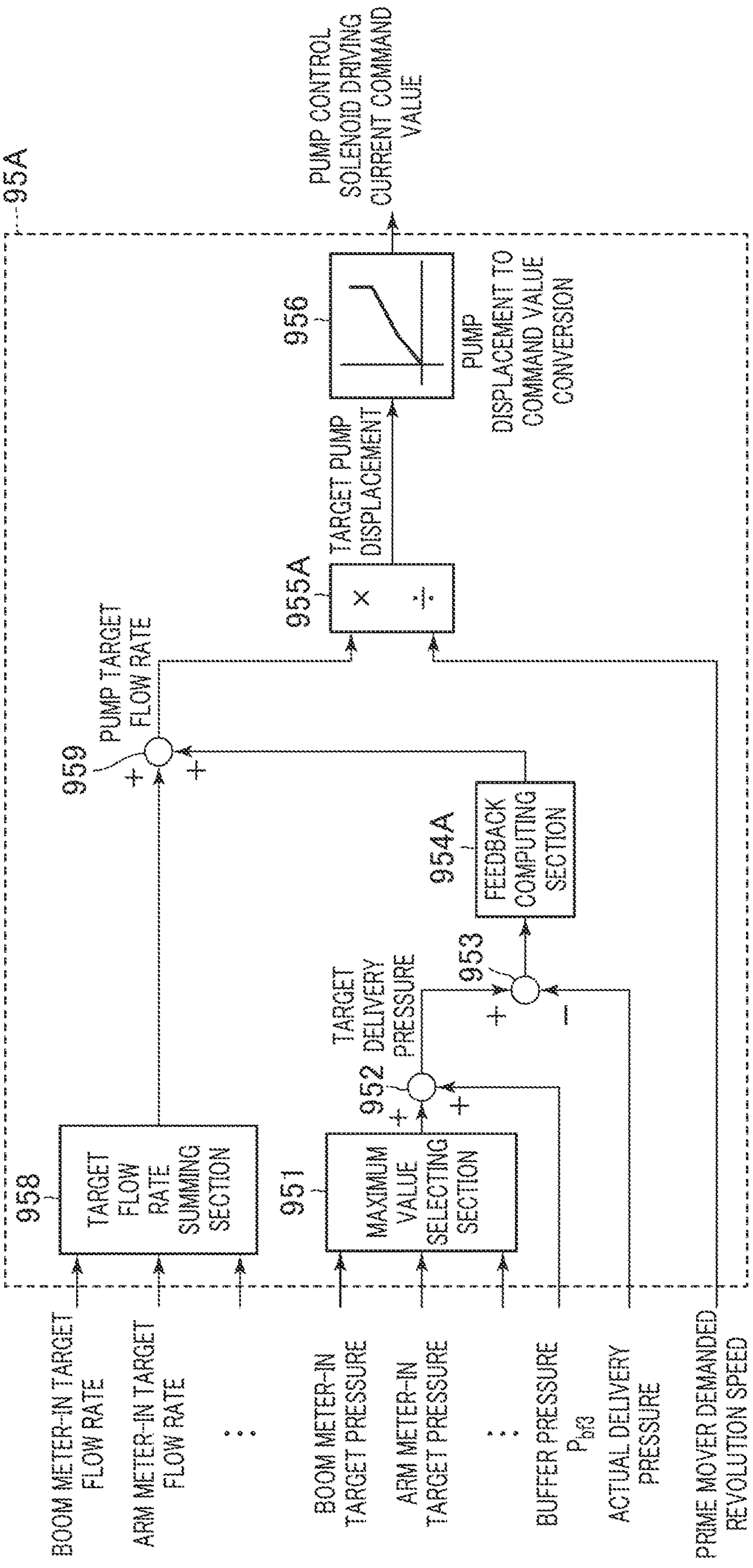
FIG. 20 is a control block diagram of a pump displacement command computing section in the controller according to the second embodiment illustrated in FIG. 16.

Next, details of the computation of the pump displacement command computing section in the present embodiment will be described with reference to FIG. 16 and FIG. 20. FIG. 20 is a control block diagram of the pump displacement command computing section in the controller according to the second embodiment illustrated in FIG. 16.

As illustrated in FIG. 16, the pump displacement command computing section 95A computes the displacement command value Cq of the hydraulic pump 31 on the basis of the instruction signal from the revolution speed dial 7 (demanded revolution speed of the prime mover 32), the sensing signal from the delivery pressure sensor 61 (actual delivery pressure of the hydraulic pump 31), the meter-in target pressures Pit of the hydraulic actuators 20, 21, and 5 as a computation result of the target pressure computing section 93A, and the meter-in target flow rates Qit of the hydraulic actuators 20, 21, and 5 as a computation result of the target flow rate computing section 101.

Specifically, as illustrated in FIG. 20, a target flow rate summing section 958 and a pump target flow rate computing section 959 are provided in addition to a maximum value selecting section 951, an adding section 952, a deviation computing section 953, a feedback computing section 954A, a target pump displacement computing section 955A, and a command converting section 956 as functional sections similar to those of the first embodiment. The respective functional sections of the maximum value selecting section 951, the adding section 952, the deviation computing section 953, and the command converting section 956 perform computation processing similar to that in the case of the first embodiment, and thus, description thereof will be omitted.

The target flow rate summing section 958 computes a demanded flow rate of the hydraulic pump 31 by summing all of the meter-in target flow rates Qit of the respective hydraulic actuators 20, 21, and 5 as a computation result of the target flow rate computing section 101. The feedback computing section 954A computes a feedback correction value of the target flow rate of the hydraulic pump 31 according to feedback control, on the basis of the pressure deviation of the hydraulic pump 31 (deviation between the target delivery pressure and the actual delivery pressure of the hydraulic pump 31) output from the deviation computing section 953. The pump target flow rate computing section 959 computes a pump target flow rate as a target value of a delivery flow rate of the hydraulic pump 31 by adding the feedback correction value as a computation result of the feedback computing section 954A to the demanded flow rate of the hydraulic pump 31 as a computation result of the target flow rate summing section 958. The target pump displacement computing section 955A computes a target pump displacement of the hydraulic pump 31 by dividing the pump target flow rate as a computation result of the pump target flow rate computing section 959 by the demanded revolution speed of the prime mover 32 (for example, converted on the basis of the instruction signal from the revolution speed dial 7).

Figure 21:
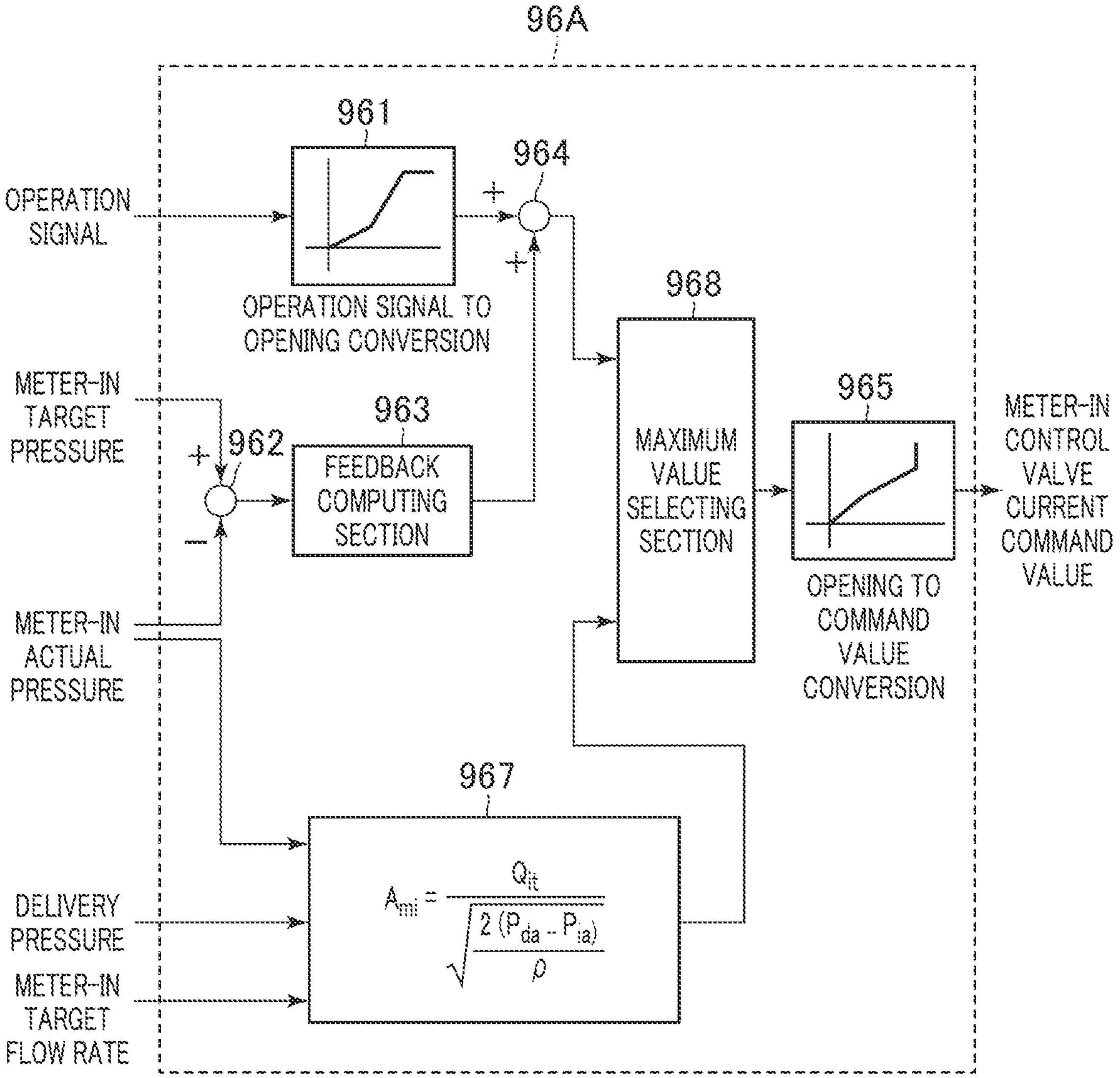
FIG. 21 is a control block diagram of a meter-in control valve command computing section in the controller according to the second embodiment illustrated in FIG. 16.

Next, details of the computation of the meter-in control valve command computing section according to the present embodiment will be described with reference to FIG. 16 and FIG. 21. FIG. 21 is a control block diagram of the meter-in control valve command computing section in the controller according to the second embodiment illustrated in FIG. 16.

As illustrated in FIG. 16, the meter-in control valve command computing section 96A computes the meter-in command values Ci for commanding the driving of the meter-in control valves 34, 36, and 38, on the basis of the operation signal from the operation device 6, the meter-in target pressures Pit of the hydraulic actuators 20, 21, and 5 as a computation result of the target pressure computing section 93A, the actual pressures Pia on the meter-in sides of the hydraulic actuators 20, 21, and 5 as a computation result of the actual pressure computing section 94A (sensed values obtained by the first to third pressure sensors 62 to 67), the sensed value obtained by the delivery pressure sensor 61 (actual delivery pressure Pda of the hydraulic pump 31), and the meter-in target flow rates Qit of the hydraulic actuators 20, 21, and 5 as a computation result of the target flow rate computing section 101.

Specifically, as illustrated in FIG. 21, the meter-in control valve command computing section 96A has a second meter-in target opening computing section 967 and a maximum value selecting section 968 in addition to a meter-in opening converting section 961, a deviation computing section 962, a feedback computing section 963, a meter-in target opening computing section 964, and a command converting section 965 as functional sections similar to those of the first embodiment. The respective functional sections of the meter-in opening converting section 961, the deviation computing section 962, the feedback computing section 963, the meter-in target opening computing section 964, and the command converting section 965 perform computation processing similar to that in the case of the first embodiment, and thus, description thereof will be omitted. In brief, these functional sections 961 to 964 compute target openings on the basis of pressure deviations between the meter-in target pressures Pit of the meter-in control valves 34, 36, and 38 and the actual pressures on the meter-in sides.

The second meter-in target opening computing section 967 computes target openings Ami of the meter-in control valves 34, 36, and 38 by using a hydrodynamic relational equation (fluid restrictor relational equation) between differential pressures across the meter-in control valves 34, 36, and 38, the openings of the meter-in control valves 34, 36, and 38, and passing flow rates (meter-in flow rates) of the meter-in control valves 34, 36, and 38. Specifically, the second meter-in target opening computing section 967 computes the target openings Ami by using the following Equation. The target openings Ami as a computation result are output to the maximum value selecting section 968.

$$A_{mi} = \frac{Q_{it}}{\sqrt{\frac{2(P_{da} - P_{ia})}{\rho}}} \quad \text{[Expression 12]}$$

Here, Qit denotes the meter-in target flow rates of the hydraulic actuators 20, 21, and 5 as a computation result of the target flow rate computing section 101, Pda denotes the actual delivery pressure of the hydraulic pump 31, Pia denotes the actual pressures on the meter-in sides of the hydraulic actuators 20, 21, and 5, and ρ denotes the density of the hydraulic operating fluid.

The target openings Ami are calculated by inputting the sensed value obtained by the delivery pressure sensor 61 to Pda, and inputting, to Pia, the sensed value obtained one of the first to third pressure sensors 62 to 67 as a computation result of the actual pressure computing section 94A. The density p of the hydraulic operating fluid is stored in the storage device 81 in advance.

The maximum value selecting section 968 selects larger target openings of the target openings as a computation result of the meter-in target opening computing section 964 and the target openings as a computation result of the second meter-in target opening computing section 967, and outputs the larger target openings to the command converting section 965. The target openings as a computation result of the meter-in target opening computing section 964 are determined on the basis of the deviations between the meter-in target pressures Pit of the meter-in control valves 34, 36, and 38 and the actual pressures Pia on the meter-in sides. In contrast, the target openings as a computation result of the second meter-in target opening computing section 967 are determined on the basis of the meter-in target flow rates Qit of the meter-in control valves 34, 36, and 38 by the fluid restrictor relational equation. Thus, in the present embodiment, the control of the meter-in control valves 34, 36, and 38 can be performed on the basis of the meter-in target flow rates Qit. However, when a situation occurs in which the pressures on the meter-in sides of the meter-in control valves 34, 36, and 38 are decreased due to the control based on the computation result of the second meter-in target opening computing section 967, the maximum value selecting section 968 switches to the control based on the meter-in target pressures Pit (computation result of the meter-in target opening computing section 964). The occurrence of cavitation can thus be prevented.

Figure 22:
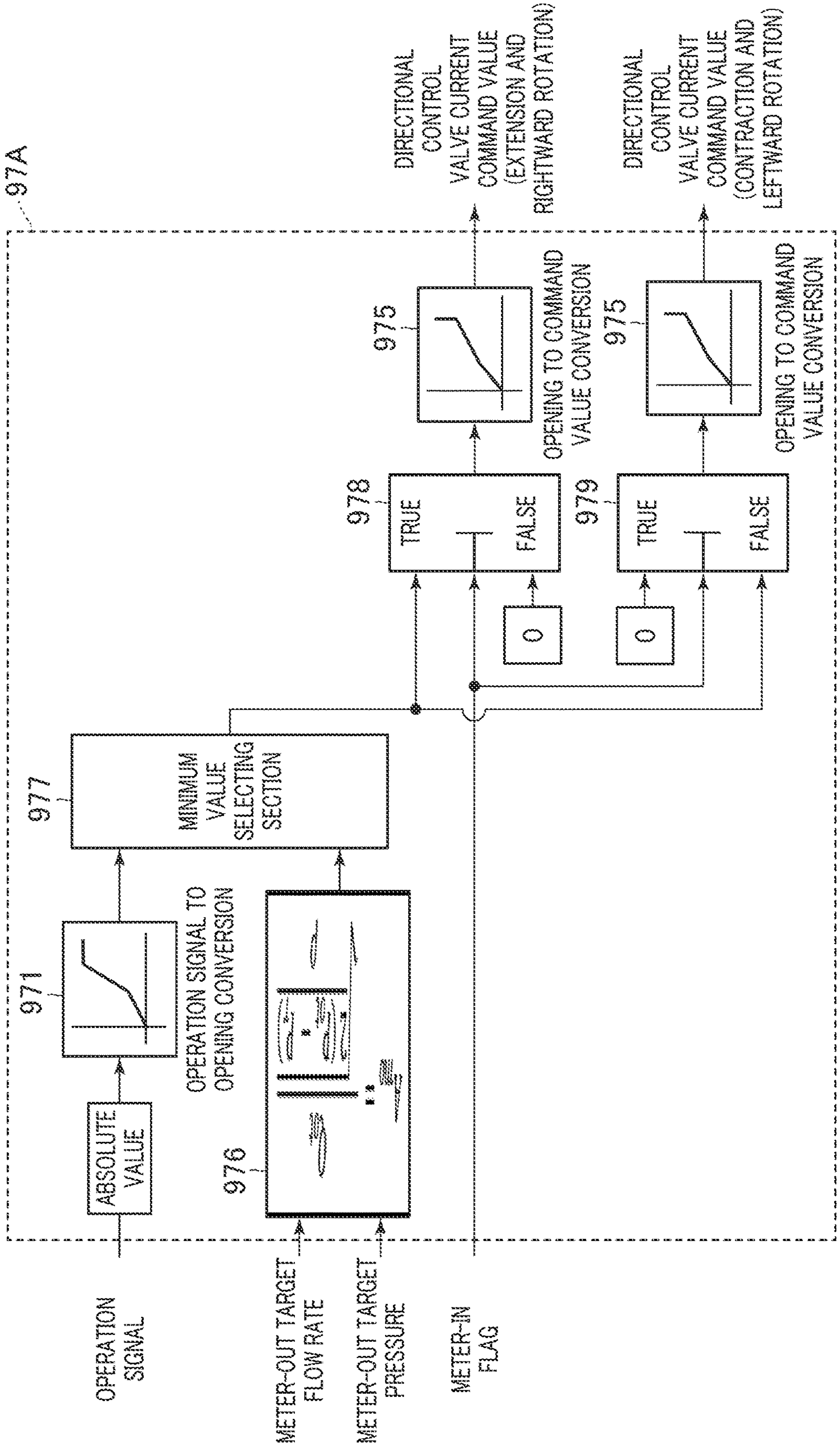
FIG. 22 is a control block diagram of a directional control valve command computing section in the controller according to the second embodiment illustrated in FIG. 16.

Next, details of the computation of the directional control valve command computing section in the present embodiment will be described with reference to FIG. 16 and FIG. 22. FIG. 22 is a control block diagram of the directional control valve command computing section in the controller according to the second embodiment illustrated in FIG. 16.

As illustrated in FIG. 16, the directional control valve command computing section 97A computes the meter-out command values Cd of the directional control valves 35, 37, and 39 on the basis of the operation signal from the operation device 6, the meter-out target pressures Pot and the meter-in flags fg of the hydraulic actuators 20, 21, and 5 as a computation result of the target pressure computing section 93A, and the meter-out target flow rates Qot of the hydraulic actuators 20, 21, and 5 as a computation result of the target flow rate computing section 101. Incidentally, the meter-out target flow rates Qot of the hydraulic actuators 20, 21, and 5 are calculated from the target velocities Vt (ωt) corresponding to the operation signal of the operation device 6.

Specifically, as illustrated in FIG. 22, the directional control valve command computing section 97A has a meter-out opening converting section 971 and a command converting section 975 as functional sections similar to those in the case of the first embodiment. However, the absolute value of the operation signal from the operation device 6 is input to the meter-out opening converting section 971, and the meter-out opening converting section 971 computes demanded values of meter-out openings of the directional control valves 35, 37, and 39 according to the absolute value of the operation signal. Further, a meter-out target opening computing section 976 that performs computation by using a hydrodynamic relational equation as well as a minimum value selecting section 977, a first switching section 978, and a second switching section 979 are provided in place of functional sections of the deviation computing section 972, the feedback computing section 973, and the meter-out target opening computing section 974 as functional sections in the case of the first embodiment.

The meter-out target opening computing section 976 computes meter-out target openings Amo of the directional control valves 35, 37, and 39 by using the following Equation as a hydrodynamic relational equation (fluid restrictor relational equation) between differential pressures across the meter-out passage sides of the directional control valves 35, 37, and 39, the meter-out openings of the directional control valves 35, 37, and 39, and passing flow rates (meter-out flow rates) on the meter-out passage sides of the directional control valves 35, 37, and 39. The target openings Amo as a computation result are output to the minimum value selecting section 977.

$$A_{mo} = \frac{Q_{ot}}{\sqrt{\frac{2(P_{ot} - P_s)}{\rho}}} \quad \text{[Expression 13]}$$

Here, Qot denotes the meter-out target flow rates of the hydraulic actuators 20, 21, and 5 as a computation result of the target flow rate computing section 101, Pot denotes the meter-out target pressures of the hydraulic actuators 20, 21, and 5 as a computation result of the target pressure computing section 93A, Ps denotes the pressure of the tank line 52 connected to the directional control valves 35, 37, and 39, and ρ denotes the density of the hydraulic operating fluid. Ps is, for example, a pressure corresponding to the pressure of the hydraulic operating fluid tank 41 or a set value such as 0, and is stored in the storage device 81 in advance.

The minimum value selecting section 977 compares the meter-out opening demanded values of the directional control valves 35, 37, and 39 corresponding to the operation signal of the operation device 6 as a computation result of the meter-out opening converting section 971 with the target openings of the directional control valves 35, 37, and 39 as a computation result of the meter-out target opening computing section 976, and selects minimum values thereof as meter-out target openings. The selected minimum values as the meter-out target openings are output to the first switching section 978 and the second switching section 979.

The first switching section 978 and the second switching section 979 switch the driving directions of the directional control valves 35, 37, and 39 according to the meter-in flags fg ("True" or "False") as a processing result of the target pressure computing section 93A. When the meter-in flags fg are "True," that is, when the bottom chambers 20*b* and 21*b* of the hydraulic cylinders 20 and 21 or the first port 5*a* of the hydraulic motor 5 is the meter-in side, the first switching section 978 outputs the meter-out target openings input from the minimum value selecting section 977, to the command converting section 975. Consequently, the driving directions of the directional control valves 35, 37, and 39 are switched such that the hydraulic actuators 20, 21, and 5 are driven in the extending direction or the rightward rotational direction. When the meter-in flags fg are "False," on the other hand, "0" is output. When the meter-in flags are "False," that is, when the rod chambers 20*r* and 21*r* or the second port 5*b* is the meter-in side, the second switching section 979 outputs the meter-out target openings input from the minimum value selecting section 977, to the command converting section 975. Consequently, the driving directions of the directional control valves 35, 37, and 39 are switched such that the hydraulic actuators 20, 21, and 5 are driven in the contracting direction or the leftward rotational direction. When the meter-in flags fg are "True," on the other hand, "0" is output.

In the second embodiment described above, as in the case of the first embodiment, when the driven bodies 17, 18, 19, and 2 are operated in an acting direction of inertia, at least either the hydraulic pump 31 (pump) or the meter-in control valves 34, 36, and 38 are controlled such that the pressures on the meter-in sides of the hydraulic actuators 20, 21, 22, and 5 (fluid pressure actuator) are equal to or higher than the predetermined value, while the driving velocities of the hydraulic actuators 20, 21, 22, and 5 (fluid pressure actuator) are controlled by the directional control valves 35, 37, and 39 (meter-out control valve) according to the operation of the operation device 6. Thus, by setting the predetermined value to a value at which the occurrence of cavitation can be avoided, it is possible to prevent the occurrence of cavitation in the hydraulic actuators 20, 21, 22, and 5 (fluid pressure actuator) while implementing the velocity control of the hydraulic actuators 20, 21, 22, and 5 (fluid pressure actuator) according to the operation of the operation device 6.

In addition, in the present embodiment, the controller 80A further computes the meter-in target flow rates Qit as the target values of the flow rates on the meter-in sides of the hydraulic actuators 20, 21, and 5 (fluid pressure actuator) and the meter-out target flow rates Qot as the target values of the flow rates on the meter-out sides thereof on the basis of the target velocities Vt and ωt as a computation result. The controller 80A is configured to, when the positive or negative sign of the target velocities Vt and ωt as a computation result is different from the positive or negative sign of the target thrust Ft or the target torque Tt as a computation result, set the meter-in target pressures Pit as the target values of the pressures on the meter-in sides of the hydraulic actuators 20, 21, and 5 (fluid pressure actuator) to the predetermined value or higher, compute the meter-out target pressures Pot as the target values of the pressures on the meter-out sides of the hydraulic actuators 20, 21, and 5 (fluid pressure actuator) on the basis of the target thrust Ft or the target torque Tt as a computation result and the set meter-in target pressures Pit, control the directional control valves 35, 37, and 39 (meter-out control valve) by using the meter-out target flow rates Qot as a computation result and the meter-out target pressures Pot as a computation result, and control at least either the hydraulic pump 31 (pump) or the meter-in control valves 34, 36, and 38 by using the meter-in target flow rates Qit as a computation result and the set meter-in target pressures Pit.

According to this configuration, the velocity control of the hydraulic actuators 20, 21, 22, and 5 (fluid pressure actuator) can be performed by flow rate control using the flow rate target values Qit and Qot on the meter-in sides and the meter-out sides of the hydraulic actuators 20, 21, 22, and 5 (fluid pressure actuator).

In addition, the hydraulic excavator (work machine) according to the present embodiment includes the actuator pressure sensors 62 to 67 (second pressure sensor) that sense the pressures on the meter-in sides of the hydraulic actuators 20, 21, 22, and 5 (fluid pressure actuator) and the pressures on the meter-out sides thereof. The controller 80A is configured such that the computation of the target thrust Ft or the target torque Tt computes external forces or external torque acting on the hydraulic actuators 20, 21, 22, and 5 (fluid pressure actuator) by using the sensed values obtained by the actuator pressure sensors 62 to 67 (second pressure sensor) as driven states of the hydraulic actuators 20, 21, 22, and 5 (fluid pressure actuator), and calculates thrust or torque of the hydraulic actuators 20, 21, 22, and 5 (fluid pressure actuator) that can cancel out the external forces or the external torque as a computation result.

According to this configuration, it is possible to prevent the occurrence of cavitation in the hydraulic actuators 20, 21, 22, and 5 (fluid pressure actuator) while implementing the velocity control of the hydraulic actuators 20, 21, 22, and 5 (fluid pressure actuator) according to the operation of the operation device 6 without the provision of the posture sensors that sense the posture information of the driven bodies of the front work device 3 and the upper swing structure 2.

OTHER EMBODIMENTS

It is to be noted that the present invention is not limited to the foregoing embodiments, and includes various modifications. The foregoing embodiments are described in detail to describe the present invention in an easily understandable manner, and are not necessarily limited to embodiments including all of the described configurations. For example, a part of a configuration of a certain embodiment can be replaced with a configuration of another embodiment, and a configuration of another embodiment can be added to a configuration of a certain embodiment. In addition, for a part of a configuration of each embodiment, another configuration can be added, deleted, or substituted.

For example, in the above-described embodiment, an example has been illustrated in which the present invention is applied to a hydraulic excavator. However, the present invention can be applied to various kinds of work machines including hydraulic cylinders and hydraulic motors that operate driven bodies. In addition, there has been illustrated an example of a configuration which includes the hydraulic system 30 that operates the driven bodies such as the upper swing structure 2 and the front work device 3 by hydraulic pressure (hydraulic operating fluid). However, also possible is a configuration which includes a fluid pressure system that operates the driven bodies by the fluid pressure of a working fluid other than the hydraulic operating fluid.

In addition, in the above-described embodiment, an example has been illustrated in which the directional control valves 35, 37, and 39 are configured to have the functions of the meter-out control valves that control the meter-out flow rates. However, also possible is a configuration in which the functions of controlling the meter-out flow rates are provided by control valves different from the directional control valves 35, 37, and 39.

In addition, in the above-described embodiment, an example has been illustrated in which only the meter-in control valves 34, 36, and 38 are configured to have the functions of controlling the meter-in flow rates. However, also possible is a configuration which computes combined openings of the openings of the meter-in control valves and the meter-in openings of the directional control valves, and controls the openings of the meter-in control valves on the basis of the combined openings as a computation result.

In addition, in the above-described embodiment, an example of a configuration has been illustrated in which the pump displacement command computing section 95 or 95A of the controller 80 or 80A performs computation from the instruction signal from the revolution speed dial 7. However, also possible is a configuration in which the controller 80 or 80A has a computing section that computes the demanded revolution speed of the prime mover 32 on the basis of the instruction signal from the revolution speed dial 7 and the pump displacement command computing section 95 or 95A performs computation on the basis of the demanded revolution speed of the prime mover 32 output from the computing section.

In addition, in the above-described first embodiment, an example of a configuration has been illustrated in which the target thrust and torque computing section 92 computes the target thrust Ft of each of the hydraulic cylinders 20, 21, and 22 by using the sensing signals from the respective posture sensors 24 to 28 (actual angles and angular velocities of the respective constituent members 17, 18, and 19 of the front work device 3). However, also possible is a configuration in which the target thrust Ft of each of the hydraulic actuators 20, 21, and 22 as a computation result is computed by using the sensed values obtained by stroke sensors that sense the strokes of the hydraulic cylinders 20, 21, and 22 in place of the posture sensors 26 to 28. The actual angles and angular velocities of the respective constituent members 17 to 19 of the front work device 3 which can be sensed by the posture sensors 26 to 28 are information that can be converted into the stroke lengths or stroke change amounts of the hydraulic cylinders 20 to 22, that is, information related to the driven states of the hydraulic cylinders 20 to 22.

In addition, in the above-described first embodiment, an example of a configuration has been illustrated in which the pump displacement command computing section 95 computes the displacement command value Cq for commanding the pump displacement of the hydraulic pump 31, by using the meter-in target pressures Pit of the hydraulic actuators 20, 21, and 5 as a computation result of the target pressure computing section 93, and the meter-in control valve command computing section 96 computes the meter-in command values Ci for commanding the driving of the meter-in control valves 34, 36, and 38, by using the meter-in target pressures Pit of the hydraulic actuators 20, 21, and 5 as a computation result of the target pressure computing section 93, so that the controller 80 performs control such that the pressures on the meter-in sides of the hydraulic actuators 20, 21, and 5 are equal to or higher than a predetermined value. That is, the controller 80 is configured to perform the pressure control of the hydraulic pump 31 and perform the pressure control of the meter-in control valves 34, 36, and 38, and thereby perform control such that the pressures on the meter-in sides of the hydraulic actuators 20, 21, and 5 are equal to or higher than the predetermined value. However, when there is only one hydraulic actuator, the controller can be configured to perform only the pressure control of the hydraulic pump 31 without performing the pressure control of the meter-in control valves 34, 36, and 38, and thereby perform control such that the pressures on the meter-in sides of the hydraulic actuators are equal to or higher than the predetermined value. That is, the controller can be configured to perform control such that the pressures on the meter-in sides of the hydraulic actuators are equal to or higher than the predetermined value only with the pump displacement command computing section 95 computing the displacement command value Cq by using the meter-in target pressures Pit of the hydraulic actuators. In addition, also possible is a configuration which reduces the pressure of the hydraulic fluid from the hydraulic pump 31 by the meter-in control valves 34, 36, and 38 as appropriate while controlling the delivery pressure of the hydraulic pump 31 in such a manner as to open the main relief valve 43, and thereby perform control such that the pressures on the meter-in sides of all of the plurality of hydraulic actuators 20, 21, and 5 are equal to or higher than the predetermined value. That is, the controller can also be configured to perform control such that the pressures on the meter-in sides of the hydraulic actuators are equal to or higher than the predetermined value, with the pump displacement command computing section 95 computing the displacement command value Cq without using the meter-in target pressures Pit of the hydraulic actuators 20, 21, and 5, and with the meter-in control valve command computing section 96 computing the meter-in command values Ci of the meter-in control valves 34, 36, and 38 by using the meter-in target pressures Pit of the hydraulic actuators 20, 21, and 5. In this case, however, a decrease in the energy efficiency of the hydraulic pump 31 needs to be taken into consideration.

DESCRIPTION OF REFERENCE CHARACTERS

2: Upper swing structure (driven body)
5: Swing hydraulic motor (fluid pressure actuator)
6: Joystick (operation device)
17: Boom (driven body)
18: Arm (driven body)
19: Bucket (driven body)
20: Boom cylinder (fluid pressure actuator)
21: Arm cylinder (fluid pressure actuator)
22: Bucket cylinder (fluid pressure actuator)
24: First posture sensor (posture sensor)
25: Second posture sensor (posture sensor)
26 to 28: Third to fifth posture sensors (posture sensor)
31: Hydraulic pump (pump)
34: First meter-in control valve
36: Second meter-in control valve
38: Third meter-in control valve
35: First directional control valve (meter-out control valve)
37: Second directional control valve (meter-out control valve)
39: Third directional control valve (meter-out control valve)
61: Delivery pressure sensor (first pressure sensor)
62, 63: First actuator pressure sensor (second pressure sensor)
64, 65: Second actuator pressure sensor (second pressure sensor)
66, 67: Third actuator pressure sensor (second pressure sensor)
80, 80A: Controller

The invention claimed is:

1. A work machine comprising:

a fluid pressure actuator that operates a driven body by being driven by supply and discharge of working fluid;

a pump that supplies the working fluid to the fluid pressure actuator;

a meter-in control valve capable of controlling a flow rate of the working fluid supplied from the pump to the fluid pressure actuator;

a meter-out control valve capable of controlling a flow rate of the working fluid discharged from the fluid pressure actuator;

an operation device that outputs an operation signal giving an instruction for driving of the fluid pressure actuator; and a controller that controls the pump, the meter-in control valve, and the meter-out control valve, the controller being configured to compute a target velocity of the fluid pressure actuator according to the operation signal from the operation device, compute target thrust or target torque of the fluid pressure actuator on a basis of a driven state of the fluid pressure actuator, and control a velocity of the fluid pressure actuator by the meter-out control valve on a basis of the operation signal from the operation device and control at least one of the pump and the meter-in control valve such that a pressure on a meter-in side of the fluid pressure actuator is equal to or higher than a predetermined value, in a case a positive or negative sign of the target velocity as a computation result is different from a positive or negative sign of the target thrust or the target torque as a computation result, the work machine comprising:

a first pressure sensor that senses a delivery pressure of the pump; and a second pressure sensor that senses the pressure on the meter-in side of the fluid pressure actuator, wherein the controller is configured to compute the target thrust or the target torque on a basis of the target velocity as a computation result, and the controller is configured to, in a case the positive or negative sign of the target velocity as a computation result is different from the positive or negative sign of the target thrust or the target torque as a computation result, set a meter-in target pressure as a target value of the pressure on the meter-in side of the fluid pressure actuator to the predetermined value or higher, compute a meter-out target pressure as a target value of a pressure on a meter-out side of the fluid pressure actuator on a basis of the target thrust or the target torque as a computation result and the set meter-in target pressure, control the meter-out control valve by using the meter-out target pressure as a computation result, control the pump on a basis of the set meter-in target pressure and a sensed value obtained by the first pressure sensor, and control the meter-in control valve on a basis of the set meter-in target pressure and a sensed value obtained by the second pressure sensor.

2. The work machine according to claim 1, comprising:

a posture sensor that senses posture information of the driven body, wherein the controller is configured to compute the target thrust or the target torque by using sensed information obtained by the posture sensor as a driven state of the fluid pressure actuator and inertia of the driven body.

3. A work machine comprising:

a fluid pressure actuator that operates a driven body by being driven by supply and discharge of working fluid;

a pump that supplies the working fluid to the fluid pressure actuator;

a meter-in control valve capable of controlling a flow rate of the working fluid supplied from the pump to the fluid pressure actuator;

a meter-out control valve capable of controlling a flow rate of the working fluid discharged from the fluid pressure actuator;

an operation device that outputs an operation signal giving an instruction for driving of the fluid pressure actuator; and a controller that controls the pump, the meter-in control valve, and the meter-out control valve, the controller being configured to compute a target velocity of the fluid pressure actuator according to the operation signal from the operation device, compute target thrust or target torque of the fluid pressure actuator on a basis of a driven state of the fluid pressure actuator, and control a velocity of the fluid pressure actuator by the meter-out control valve on a basis of the operation signal from the operation device and control at least one of the pump and the meter-in control valve such that a pressure on a meter-in side of the fluid pressure actuator is equal to or higher than a predetermined value, in a case a positive or negative sign of the target velocity as a computation result is different from a positive or negative sign of the target thrust or the target torque as a computation result, wherein the controller is configured to further compute a meter-in target flow rate as a target value of a flow rate on the meter-in side of the fluid pressure actuator and a meter-out target flow rate as a target value of a flow rate on a meter-out side of the fluid pressure actuator on a basis of the target velocity as a computation result, and the controller is configured to, in a case the positive or negative sign of the target velocity as a computation result is different from the positive or negative sign of the target thrust or the target torque as a computation result, set a meter-in target pressure as a target value of the pressure on the meter-in side of the fluid pressure actuator to the predetermined value or higher, compute a meter-out target pressure as a target value of a pressure on the meter-out side of the fluid pressure actuator on a basis of the target thrust or the target torque as a computation result and the set meter-in target pressure, control the meter-out control valve by using the meter-out target flow rate as a computation result and the meter-out target pressure as a computation result, and control at least one of the pump and the meter-in control valve by using the meter-in target flow rate as a computation result and the set meter-in target pressure.

* * * * *